US011356897B2

(12) United States Patent
Salkintzis

(10) Patent No.: US 11,356,897 B2
(45) Date of Patent: Jun. 7, 2022

(54) MEASURING ACCESS NETWORK PERFORMANCE FOR A MULTI-ACCESS DATA CONNECTION

(71) Applicant: Lenovo (Singapore) PTE. LTD., New Tech Park (SG)

(72) Inventor: Apostolis Salkintzis, Athens (GR)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 16/754,098

(22) PCT Filed: May 22, 2018

(86) PCT No.: PCT/EP2018/063313
§ 371 (c)(1),
(2) Date: Apr. 6, 2020

(87) PCT Pub. No.: WO2019/223852
PCT Pub. Date: Nov. 28, 2019

(65) Prior Publication Data
US 2020/0336940 A1 Oct. 22, 2020

(51) Int. Cl.
*H04W 28/08* (2009.01)
*H04W 40/12* (2009.01)
*H04W 88/08* (2009.01)

(52) U.S. Cl.
CPC ..... *H04W 28/0942* (2020.05); *H04W 28/085* (2013.01); *H04W 40/12* (2013.01); *H04W 88/085* (2013.01)

(58) Field of Classification Search
CPC ........... H04W 28/085; H04W 28/0942; H04W 40/12; H04W 72/085; H04W 76/16; H04W 88/06; H04W 88/085
See application file for complete search history.

(56) References Cited

U.S. PATENT DOCUMENTS 10,142,894 B2 * 11/2018 Himayat ........... H04W 36/0066
10,356,697 B2 * 7/2019 Lee .......................... H04L 47/20
(Continued)

OTHER PUBLICATIONS

PCT/EP2018/063313, "Notification of Transmittal of the International Search Report and the Written Opinion of the International Searching Authority, or the Declaration", PCT, Feb. 7, 2019, pp. 1-32.
(Continued)

*Primary Examiner* — Ahmed Elallam
(74) *Attorney, Agent, or Firm* — Kunzler Bean & Adamson

(57) ABSTRACT

Apparatuses, methods, and systems are disclosed for measuring access network performance ("ANP") parameters for a multi-access data connection. One apparatus includes a processor, a first transceiver and a second transceiver that communicate with a mobile communication network via a first access network and a second access network, respectively. The processor establishes a multi-access data connection with the mobile communication network over the first access network and the second access network and receives measurement assistance information. The processor measures at least one ANP parameter using the measurement assistance information and applies a traffic steering rule to uplink data traffic, the traffic steering rule indicating to which of the first and second access networks the uplink data traffic is to be routed based on the measured at least one ANP parameter.

20 Claims, 13 Drawing Sheets

(56) References Cited

U.S. PATENT DOCUMENTS

| | | | | |
|---|---|---|---|---|
| 2015/0327139 A1* | 11/2015 | Sirotkin | ............... | H04W 76/27 370/332 |
| 2016/0119939 A1* | 4/2016 | Himayat | ........... | H04W 72/0446 370/329 |
| 2016/0255533 A1* | 9/2016 | Sirotkin | ............ | H04W 72/0486 370/230 |
| 2017/0019835 A1* | 1/2017 | Lee | ....................... | H04W 48/14 |
| 2017/0289888 A1 | 10/2017 | Salkintzis | | |
| 2018/0152862 A1* | 5/2018 | Nagasaka | ............. | H04W 28/08 |
| 2018/0262924 A1* | 9/2018 | Dao | .................. | H04W 72/1257 |
| 2019/0306752 A1* | 10/2019 | Lai | ........................ | H04W 48/18 |
| 2020/0178196 A1* | 6/2020 | Wang | .................... | H04W 76/16 |
| 2021/0014734 A1* | 1/2021 | Liu | ........................ | H04W 76/16 |

OTHER PUBLICATIONS

Oppo, "ATSSS procedure for TFCP solution", SA WG2 Meeting #127 S2-183390, Apr. 16-20, 2018, pp. 1-5.

Motorola Mobility, Lenovo, "Consolidated ATSSS Solution", SA WG2 Meeting #128 S2-186439, Jul. 2-6, 2018, pp. 1-5.

Motorola Mobility, Lenovo, "New Solution: Traffic Steering using Access Network Performance Measurements", SA WG2 Meeting #127-bis S2-185622, pp. 1-7.

3GPP, "3rd Generation Partnership Project; Technical Specification Group Services and System Aspects; Procedures for the 5G System; Stage 2 (Release 15)", 3GPP TS 23.502 V15.1.0, Mar. 2018, pp. 1-285.

3GPP, "3rd Generation Partnership Project; Technical Specification Group Services and System Aspects; Study on Access Traffic Steering, Switching and Splitting support in the 5G system architecture (Release 16)", 3GPP TR 23.793 70.4.0, Mar. 2018, pp. 1-58.

ETRI, "Updating 6.2 Solution 2 to add a procedure for Multi-Access PDU Session Modification", SA WG2 Meeting #127-Bis S2-185001, May 28-Jun. 1, 2018, pp. 1-3.

\* cited by examiner

MEASURING ACCESS NETWORK PERFORMANCE FOR A MULTI-ACCESS DATA CONNECTION

FIELD

The subject matter disclosed herein relates generally to wireless communications and more particularly relates to measuring access network performance parameters for a multi-access data connection.

BACKGROUND

The following abbreviations and acronyms are herewith defined, at least some of which are referred to within the following description.

Third Generation Partnership Project ("3GPP"), Access and Mobility Management Function ("AMF"), Access Network Performance ("ANP"), Access Point Name ("APN"), Access Stratum ("AS"), Carrier Aggregation ("CA"), Clear Channel Assessment ("CCA"), Control Channel Element ("CCE"), Channel State Information ("CSI"), Common Search Space ("CSS"), Data Network Name ("DNN"), Data Radio Bearer ("DRB"), Downlink Control Information ("DCI"), Downlink ("DL"), Enhanced Clear Channel Assessment ("eCCA"), Enhanced Mobile Broadband ("eMBB"), Evolved Node-B ("eNB"), Evolved Packet Core ("EPC"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Globally Unique Temporary UE Identity ("GUTI"), Hybrid Automatic Repeat Request ("HARQ"), Home Subscriber Server ("HSS"), Internet-of-Things ("IoT"), Key Performance Indicators ("KPI"), Licensed Assisted Access ("LAA"), Load Based Equipment ("LBE"), Listen-Before-Talk ("LBT"), Long Term Evolution ("LTE"), LTE Advanced ("LTE-A"), Medium Access Control ("MAC"), Multiple Access ("MA"), Modulation Coding Scheme ("MCS"), Machine Type Communication ("MTC"), Massive MTC ("mMTC"), Mobility Management ("MM"), Mobility Management Entity ("MME"), Multiple Input Multiple Output ("MIMO"), Multipath TCP ("MPTCP"), Multi User Shared Access ("MUSA"), Non-Access Stratum ("NAS"), Narrowband ("NB"), Network Function ("NF"), Next Generation (e.g., 5G) Node-B ("gNB"), Next Generation Radio Access Network ("NG-RAN"), New Radio ("NR"), Policy Control & Charging ("PCC"), Policy Control Function ("PCF"), Policy Control and Charging Rules Function ("PCRF"), Packet Data Network ("PDN"), Packet Data Unit ("PDU"), PDN Gateway ("PGW"), Quality of Service ("QoS"), Quadrature Phase Shift Keying ("QPSK"), Radio Access Network ("RAN"), Radio Access Technology ("RAT"), Radio Resource Control ("RRC"), Receive ("RX"), Switching/Splitting Function ("SSF"), Scheduling Request ("SR"), Serving Gateway ("SGW"), Session Management Function ("SMF"), System Information Block ("SIB"), Transport Block ("TB"), Transport Block Size ("TBS"), Time-Division Duplex ("TDD"), Time Division Multiplex ("TDM"), Transmission and Reception Point ("TRP"), Transmit ("TX"), Uplink Control Information ("UCI"), Unified Data Management ("UDM"), User Entity/Equipment (Mobile Terminal) ("UE"), Uplink ("UL"), User Plane ("UP"), Universal Mobile Telecommunications System ("UMTS"), Ultra-reliability and Low-latency Communications ("URLLC"), and Worldwide Interoperability for Microwave Access ("WiMAX").

In wireless communication systems, a 5G-capable UE may request the establishment of a Multi-Access PDU (MA-PDU) session, i.e. of a data connection that connects the UE and a Data Network (DN) via the mobile communication network and which is composed of two user-plane paths, each one using a different access network type. However, it is not specified how such a UE can use performance parameters of the user-plane paths to effectively route traffic.

BRIEF SUMMARY

Methods for measuring access network performance parameters for a multi-access data connection are disclosed. Apparatuses and systems also perform the functions of the methods. One method (e.g., of a user equipment) for measuring access network performance ("ANP") parameters for a multi-access data connection includes establishing, at a remote unit, a multi-access data connection with a mobile communication network over a first access network and a second access network. The method includes receiving measurement assistance information. The method includes measuring, at the remote unit, at least one ANP parameter using the measurement assistance information. The method also includes applying, at the remote unit, a traffic steering rule to uplink data traffic. Here, the traffic steering rule indicates to which of the first and second access networks the uplink data traffic is to be routed based on the measured at least one ANP parameter.

Another method (e.g., of a network function, such as a policy control function) for measuring ANP parameters for a multi-access data connection includes receiving, from a network function, a policy request message in response to a remote unit requesting a multi-access data connection with a mobile communication network over a first access network and a second access network, the policy request message indicating the remote unit supports access network performance measurements. The method includes deriving at least one traffic steering rule that contains an ANP parameter, the traffic steering rule indicating to which of the first and second access networks data traffic of the multi-access data connection is to be routed according to a measure value of the ANP parameter. The method includes determining measurement assistance information for the remote unit in response to the at least one traffic steering rule that contains an ANP parameter. The method also includes returning the at least one traffic steering rule that contains an ANP parameter and the measurement assistance information in response to the policy request message.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
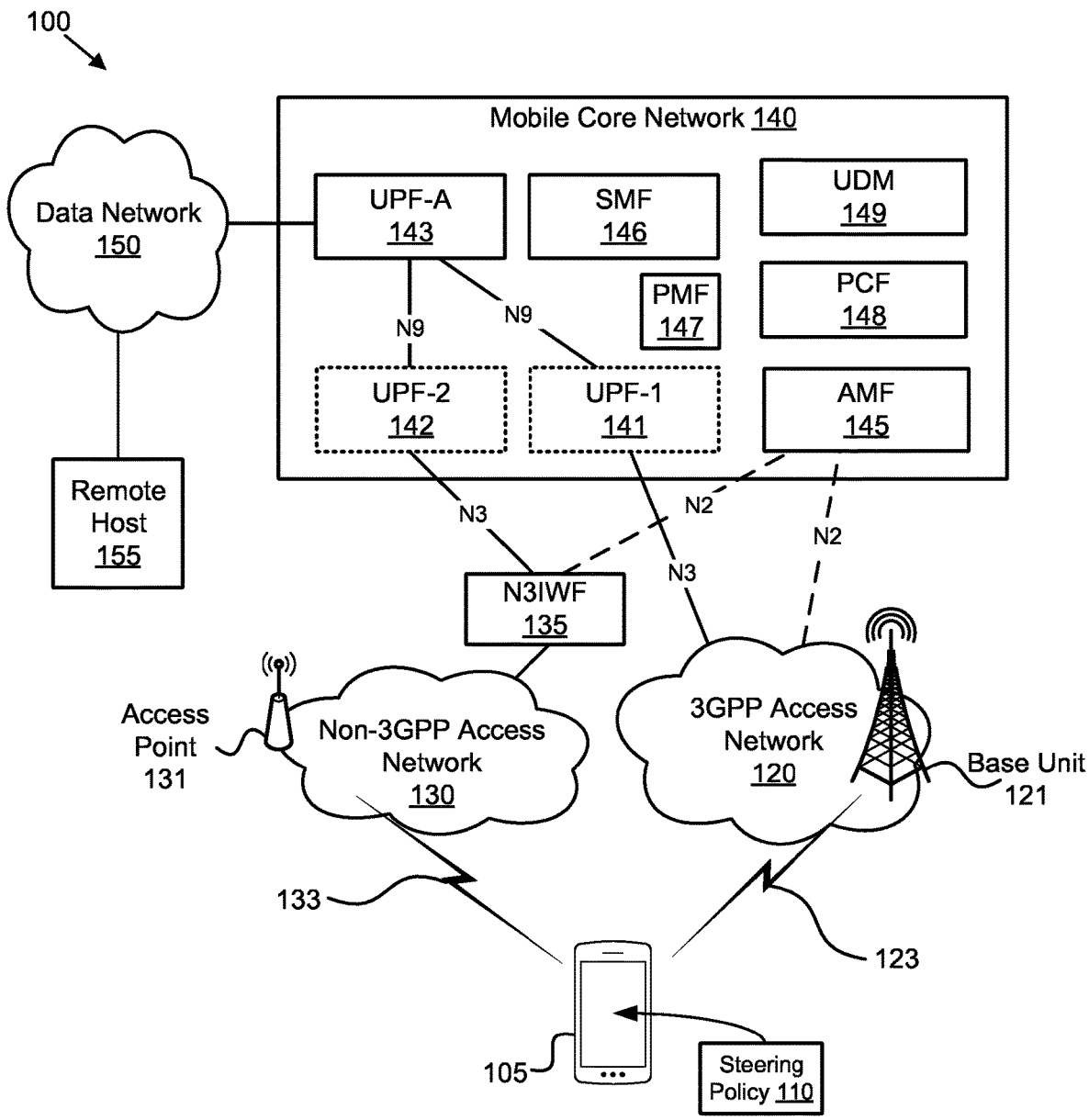
FIG. 1 is a schematic block diagram illustrating one embodiment of a wireless communication system for measuring access network performance parameters for a multi-access data connection.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed that enables a UE, after establishing a MA-PDU session, to estimate the access network performance ("ANP") parameters, such as Throughput, Delay, and Loss Rate, on both 3GPP and non-3GPP access networks. Here, the UE performs measurements to estimate the ANP parameters. Additionally, the UE may apply steering rules for the MA-PDU session that depend on the estimated parameters. For example, the UE may apply the steering rule: "Route traffic with destination 10.10.1.2 to the access with the highest Throughput" based on the estimated ANP parameters.

FIG. 1 depicts a wireless communication system 100 for measuring access network performance parameters for a multi-access data connection, according to embodiments of the disclosure. In one embodiment, the wireless communication system 100 includes at least one remote unit 105, a 3GPP access network 120 containing at least one cellular base unit 121, 3GPP communication links 123, a non-3GPP access network 130 containing at least one access point 131, non-3GPP communication links 133, and a mobile core network 140. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as subscriber units, mobiles, mobile stations, users, terminals, mobile terminals, fixed terminals, subscriber stations, UE, user terminals, a device, or by other terminology used in the art. The remote units 105 may communicate directly with one or more of the cellular base units 121 via uplink ("UL") and downlink ("DL") communication signals. Furthermore, the UL and DL communication signals may be carried over the 3GPP communication links 123. Similarly, the remote units 105 may communicate with one or more access points 131 in non-3GPP access networks 130 via UL and DL communication signals carried over the non-3GPP communication links 133.

In some embodiments, the remote units 105 communicate with a remote host 155 via a network connection with the mobile core network 140. For example, a remote unit 105 may establish a PDU session (or other data connection) with the mobile core network 140 using a 3GPP access network 120 and/or a non-3GPP access network 130. The mobile core network 140 then relays traffic between the remote unit 105 and the data network 150 (e.g., a remote host 155 in the data network 150) using the PDU session. As discussed in further detail below, the PDU session may be a multiple-access PDU ("MA-PDU") session having user-plane connections (e.g., paths) via both the 3GPP access network 120 and the non-3GPP access network 130.

The cellular base units 121 may be distributed over a geographic region. In certain embodiments, a cellular base unit 121 may also be referred to as an access terminal, a base, a base station, a Node-B, an eNB, a gNB, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121.

The non-3GPP access networks 130 also may be distributed over a geographic region. Each non-3GPP access network 130 may serve a number of remote units 105 with a serving area. Typically, the serving area of the non-3GPP access network 130 is smaller than the serving area of a cellular base unit 121. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. In certain embodiments, the 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via a non-3GPP interworking function ("N3IWF") 135. The N3IWF 135 provides interworking between a non-3GPP access network 130 and the mobile core network 140, supporting connectivity via the "N2" and "N3" interfaces. As depicted, both the 3GPP access network 120 and the N3IWF 135 communicate with the AMF 145 using a "N2" interface and with the UPFs 141, 142 using a "N3" interface.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. While the N3IWF 135 is depicted as being located outside both the non-3GPP access network 130 and the mobile core network 140, in other embodiments the N3IWF 135 may be co-located with the non-3GPP access network 130 (e.g., if the non-3GPP access network 130 is a trusted non-3GPP access network) or located within the mobile core network 140.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Here, each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes one or more user plane functions ("UPFs"). In certain embodiments, the mobile core network 140 includes a first UPF ("UPF-1") 141 that serves a 3GPP access network 120, a second UPF 142 ("UPF-2") that serves a non-3GPP access network 130, and an anchor UPF ("UPF-A") 143. In other embodiments, the 3GPP access network 120 and non-3GPP access network 130 may connect directly to the UPF-A 143 (e.g., without the need for the UPF-1 141 and UPF-2 142.

The mobile core network 140 also includes multiple control plane functions including, but not limited to, an Access and Mobility Management Function ("AMF") 145, a Session Management Function ("SMF") 146, a Policy Control Function ("PCF") 148, and a Unified Data Management function ("UDM") 149. Although specific numbers and types of network functions are depicted in FIG. 1, one of skill in the art will recognize that any number and type of network functions may be included in the mobile core network 140.

Moreover, the wireless communication system 100 includes a Performance Measurement Function ("PMF") 147. The PMF 147 is a user-plane NF used to assist the remote unit 105 in determining (e.g., estimating) the ANP parameters for each access (e.g., each of the 3GPP access network 120 and non-3GPP access network 130). In the depicted embodiment, the PMF 147 is a network function within the mobile core network 140. In certain embodiments, the PMF 147 may be implemented in a UPF, such as the UPF-A 143. However, in other embodiments the PMF 147 standalone function located outside the mobile core network 140. For example, the PMF 147 may be part of the data network 150 in some deployments. In other deployments the PMF 147 may be outside the data network 150, at a location where the remote unit 105 may establish, e.g., IP communication with the PMF.

As depicted, a remote unit 105 may be connected to both a cellular base unit 121 in a 3GPP access network 120 and an access point 131 in a non-3GPP access network 130. The remote unit 105 may establish a data connection over both the 3GPP access network 120 and the non-3GPP access network 130, thus establishing a multi-access data connection. Here, the multi-access data connection includes a first user-plane connection via the 3GPP access network 120 and a second user-plane connection via the non-3GPP access network 130.

When establishing the multi-access data connection, the remote unit 105 may receive a set of traffic steering rules (e.g., ATSSS rules), some of which may refer to a specific ANP parameter. Here, the traffic steering rules may be specific to a data network (e.g., an endpoint of the multi-access data connection), specific to a remote unit 105 (e.g., based on a subscription and/or on a roaming status of the remote unit 105), specific to a combination of data network and remote unit 105, or the like. Examples of ATSSS rules involving ANP parameters include: "Route traffic of App-A to the access with the smallest Loss Rate", "Route IMS voice traffic to the access with the smallest Delay", "Route traffic of App-B to 3GPP access, if Delay over 3GPP access is less than 40 ms", and "Route traffic of App-C to non-3GPP access, if Throughput over non-3GPP access is greater than 1 Mbps". The remote unit 105 also receives measurement assistance information, for example as part of a Measurement Assistance policy. The Measurement Assistance policy includes a set of Measurement Assistance policy rules. For example, a Measurement Assistance policy rule may indicate "Measure the Throughput on 3GPP access every 5 min by using the following parameters: PMF address=10.10.10.1, PMF port=5201, protocol=UDP, duration=5 s, max bytes=5 MBytes".

In some embodiments, the remote unit 105 may initiate a measurement session with the PMF 147 over each access (e.g., each of the 3GPP access network 120 and non-3GPP access network 130) in order to estimate the ANP parameters for each access. In one embodiment, the ANP parameters include one or more of: Throughput (e.g., an amount of data passing through the path of the PDU session over the access network), Delay (e.g., an amount of time it takes to communicate data over the path), and Loss Rate (e.g., a rate of data unsuccessfully communicated over the path). In certain embodiments, Jitter (e.g., a delay variance), or other performance parameters may be measured.

The remote unit 105 utilizes the information in the received Measurement Assistance policy to determine the address/port of PMF and other details required for the measurement session, e.g. the protocol to use, the maximum number of bytes to transmit, etc. Additionally, the remote unit 105 applies the ATSSS rules after performing a measurement session to estimate the ANP parameters on each access. As noted above, the ATSSS rules indicate which access leg of the MA-PDU session uplink traffic is to be routed.

As used herein, a PDU session refers to a network connection in the wireless communication system 100 established by the remote unit 105. A PDU session is a logical connection between the remote unit 105 and a data network, such as the data network 150. A remote unit 105 may have multiple PDU sessions at a time. Each PDU session is distinguishable by a unique combination of Data Network Name ("DNN"), Session and Service Continuity ("SSC") mode, and/or network slice identifier (e.g., S-NSSAI). In various embodiments, each PDU session is associated with a different IP address. Note however, that a MA-PDU session has a single IP address even though there are multiple user-plane connections to the mobile core network 140.

To steer traffic on a multi-access data connection, the remote unit 105 is configured, e.g., by the mobile core network 140, with a set of traffic steering rules, forming a steering policy 110 for the multi-access data connection. In one embodiment, the steering policy 110 (also referred to as an Access Traffic Steering, Switching and Splitting ("ATSSS") policy) is received during establishment of the multi-access data connection, for example in a PDU establishment accept message. Note that the Measurement Assistance policy may also be received in the PDU establishment accept message.

For each data flow using the multi-access data connection, the remote unit 105 identifies an applicable traffic steering rule and routes the traffic to a specific user-plane connection based on the applicable traffic steering rule. In various embodiments, the set of traffic steering rules is a prioritized list of rules also having a default rule (e.g., a lowest-priority rule). Traffic steering rules are examined in priority order. In some embodiments, each traffic steering rule has a traffic filter used to determine whether the rule is applicable to a data packet (e.g., of the data flow) to be sent on the multi-access data connection. A data packet matches a traffic steering rule if the information in the data packet (e.g. protocol, port number, etc.) matches with the corresponding information in the traffic filter of the rule.

Figure 2A:
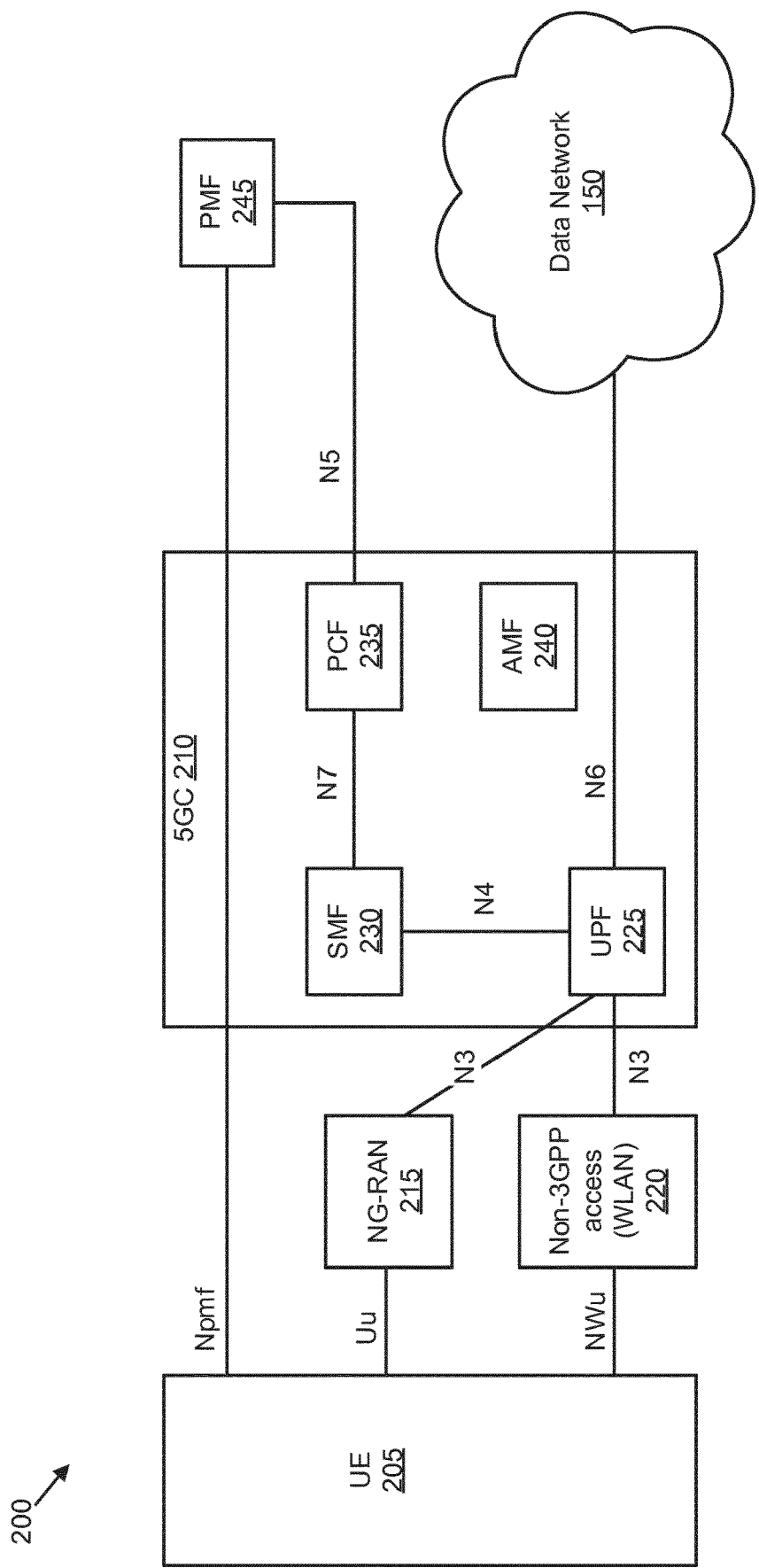
FIG. 2A is a block diagram illustrating a first embodiment of a network architecture for measuring access network performance parameters for a multi-access data connection.

FIG. 2A depicts a first network architecture 200 used for measuring access network performance parameters for a multi-access data connection, according to embodiments of the disclosure. The first network architecture 200 may be a simplified embodiment of the wireless communication system 100. As depicted, the first network architecture 200 includes a UE 205 that communicates with a UPF 225 in a 5G core network ("5GC") 210 via both a 5G RAN 215 and a Non-3GPP Access Network 220, such as a WLAN. Here, the US 205 has established a multi-access data connection with the 5GC 210 having a first user-plane connection (e.g., child PDU session) over the 5G RAN 215 and a second user-plane connection over the Non-3GPP Access Network 220. The two user-plane connections share the same IP address and compose a multi-link data connection between the UE 205 and the UPF 225.

The UE 205 may be one embodiment of the remote unit 105 and the 5GC 210 may be one embodiment of the mobile core network 140, described above. The 5G RAN 215 is one embodiment of the 3GPP access network 120 and the Non-3GPP Access Network 220 is one embodiment of the non-3GPP access network 130, described above. The mobile communication network 210 is one embodiment of the mobile core network 140, described above, and includes a UPF 225, a SMF 230, a PCF 235, and an AMF 240. The UE 205 and the PCF 235 have connections to the PMF 245 for measuring ANP parameters, as described herein. The PMF 245 may be one embodiment of the PMF 147, described above with reference to FIG. 1. While FIG. 2 shows the PMF 245 at a location outside the data network 150, in other deployments the PMF 245 may be a part of the 5GC 210 or the data network 150.

In certain embodiments, the Non-3GPP Access Network 220 accesses the mobile communication network via the N3IWF 135 (not shown here), which may be co-located with the Non-3GPP Access Network 220, located in the mobile core network, or located outside both the Non-3GPP Access Network 220 and the mobile core network, as described above. The N3IWF 135 communicates with the AMF 240 via an "N2" interface and with the second. UPF 142 via an "N3" interface. The 5G RAN 215 communicates with the AMF 240 via an "N2" interface and with the UPF 225 via an "N3" interface.

FIG. 2 shows the PMF 245 being implemented as a standalone function. The UE 205 may communicate with the PMF 245 over the user plane, using either 5G RAN 215 (e.g., 3GPP access) or Non-3GPP Access Network 220. The Npmf is a logical interface between the UE 205 and PMF 245, here employing IP transport. The protocols running over Npmf are used to support measurement sessions between the UE 205 and PMF 245, and to measure ANP parameters such as Throughput, Delay and Loss Rate. In certain embodiments, the communication between the UE 205 and PMF 245 over Npmf used to measure ANP parameters may be based on existing tools that can measure ANP parameters, such as the iPerf tool. In other embodiments, proprietary tools may be used to measure the ANP parameters.

During the MA-PDU session establishment, the UE 205 is provided with a Measurement Assistance policy, which is created by PCF 235 and defines how the UE 205 is to measure certain parameters on the 3GPP and non-3GPP accesses (e.g., the 5G RAN 215 and Non-3GPP Access Network 220), including the Throughput, the Delay and the Loss Rate. These parameters are referred to as "Access Network Performance" (ANP) parameters.

In various embodiments, the Measurement Assistance policy received by the UE 205 may indicate one or more of: the IP address and port of a network function with which the UE can initiate measurement sessions (e.g., the IP address and port of the PMF 245; note that in certain embodiments the PMF 245 may be a part of the UPF 225), the protocol to use for the measurements (e.g. UDP, TCP, etc.), the maximum duration and/or the maximum number of bytes to transmit during a measurement session, and how frequently the UE should attempt to initiate a measurement session on a specific access. After establishing the MA-PDU session, the UE 205 employs the received Measurement Assistance policy to initiate measurement sessions with the PMF 245 and to determine the ANP parameters of the 5G RAN 215 and Non-3GPP Access Network 220 (e.g., the 3GPP and non-3GPP accesses).

During the MA-PDU session establishment, the UE 205 is also provided with ATSSS rules that determine how the uplink traffic of the MA-PDU session is to be distributed across the 5G RAN 215 and Non-3GPP Access Network 220 (e.g., the 3GPP and non-3GPP accesses). As mentioned, an ATSSS rule may refer to specific ANP parameters (i.e. Delay, Throughput and Loss Rate). The UE 205 applies the ATSSS rules after performing a measurement session to estimate the ANP parameters on each access.

In various embodiments, a measurement session over 3GPP (or non-3GPP) access may be initiated by the UE 205 when there is no PDU session traffic to send over 3GPP (or non-3GPP) access. This way, the measurement traffic does not interfere with and does not impact the PDU session traffic. In certain embodiments, the measurement traffic between the UE 205 and PMF 245 is not charged. Here, the PCF 235 may create appropriate PCC rules for the measurement traffic.

Moreover, Packet Detection Rules (PDRs) are provided to the UPF 225, which may also refer to specific ANP parameters. The PDRs are used by the UPF 225 to determine how the downlink traffic of the MA-PDU session is to be distributed across the 3GPP and non-3GPP accesses (here, the 5G RAN 215 and Non-3GPP Access Network 220). In the first network architecture 200, the PMF 245 sends the relevant ANP parameters to the PCF 235, which passes them to the SMF 230, which in turn forwards them to the UPF 225.

Figure 2B:
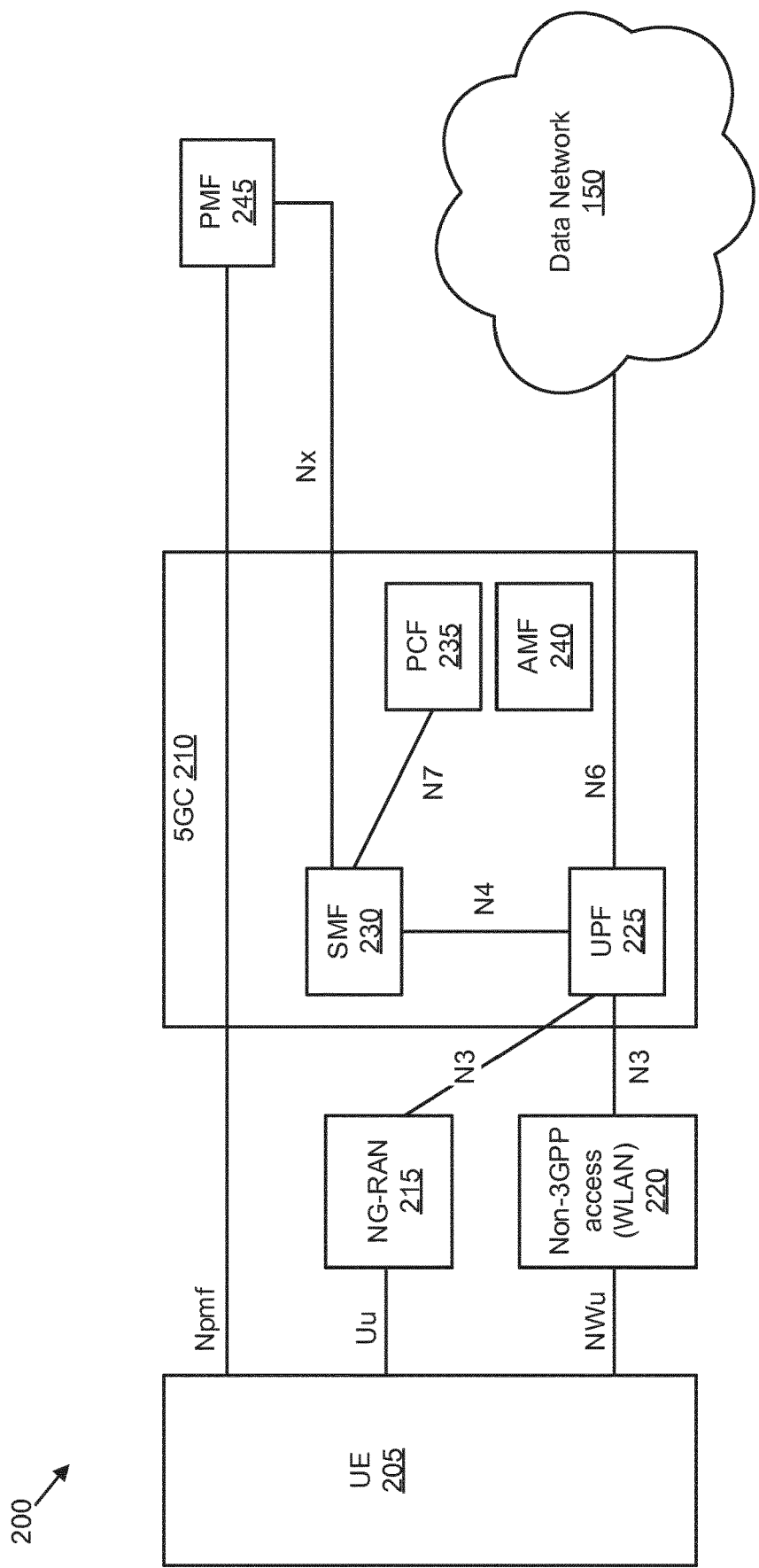
FIG. 2B is a block diagram illustrating a second embodiment of a network architecture for measuring access network performance parameters for a multi-access data connection.

FIG. 2B depicts a second network architecture 250 used for measuring access network performance parameters for a multi-access data connection, according to embodiments of the disclosure. The second network architecture 250 may be a simplified embodiment of the wireless communication system 100. As depicted, the second network architecture 250 also includes a UE 205 that communicates with a UPF 225 in a 5G core network ("5GC") 210 via both a 5G RAN 215 and a Non-3GPP Access Network 220, such as a WLAN. Here, the UE 205 has established a multi-access data connection with the 5GC 210 having a first user-plane connection (e.g., child PDU session) over the 5G RAN 215 and a second user-plane connection over the Non-3GPP Access Network 220. The two user-plane connections share the same IP address and compose a multi-link data connection between the UE 205 and the UPF 225.

In the second network architecture 250, the SMF 230 interacts with the PMF 245 via a new interface, labeled here as "Nx". The UE 205 and the SMF 230 have connections to the PMF 245, as described herein. Note that the second network architecture 250 does not require a "N5" interface between the PCF 235 and PMF 245. While FIG. 2B shows the PMF 245 being implemented as a standalone function at a location outside the data network 150, in other deployments the PMF 245 may be a part of the 5GC 210 or the data network 150.

The UE 205 may communicate with the PMF 245 over the user plane, using either 5G RAN 215 (e.g., 3GPP access) or Non-3GPP Access Network 220. Again, the Npmf interface is used to support measurement sessions between the UE 205 and PMF 245, and to measure ANP parameters such as Throughput, Delay and Loss Rate. The UE 205 is configured with a Measurement Assistance policy, created by SMF 230, which defines how the UE 205 is to measure certain parameters on the 3GPP and non-3GPP accesses.

After establishing the MA-PDU session, the UE 205 employs the received Measurement Assistance policy to initiate measurement sessions with the PMF 245 and to determine the ANP parameters of the 5G RAN 215 and Non-3GPP Access Network 220 (e.g., the 3GPP and non-3GPP accesses). As mentioned, the UE 205 applies the ATSSS rules after performing a measurement session to estimate the ANP parameters on each access.

Moreover, Packet Detection Rules (PDRs) are provided to the UPF 225, which may also refer to specific ANP parameters. The PDRs are used by the UPF 225 to determine how the downlink traffic of the MA-PDU session is to be distributed across the 3GPP and non-3GPP accesses (here, the 5G RAN 215 and Non-3GPP Access Network 220). In the second network architecture 250, the PMF 245 sends the relevant ANP parameters to the SMF 230 which forwards them to the UPF 225.

Figure 2C:
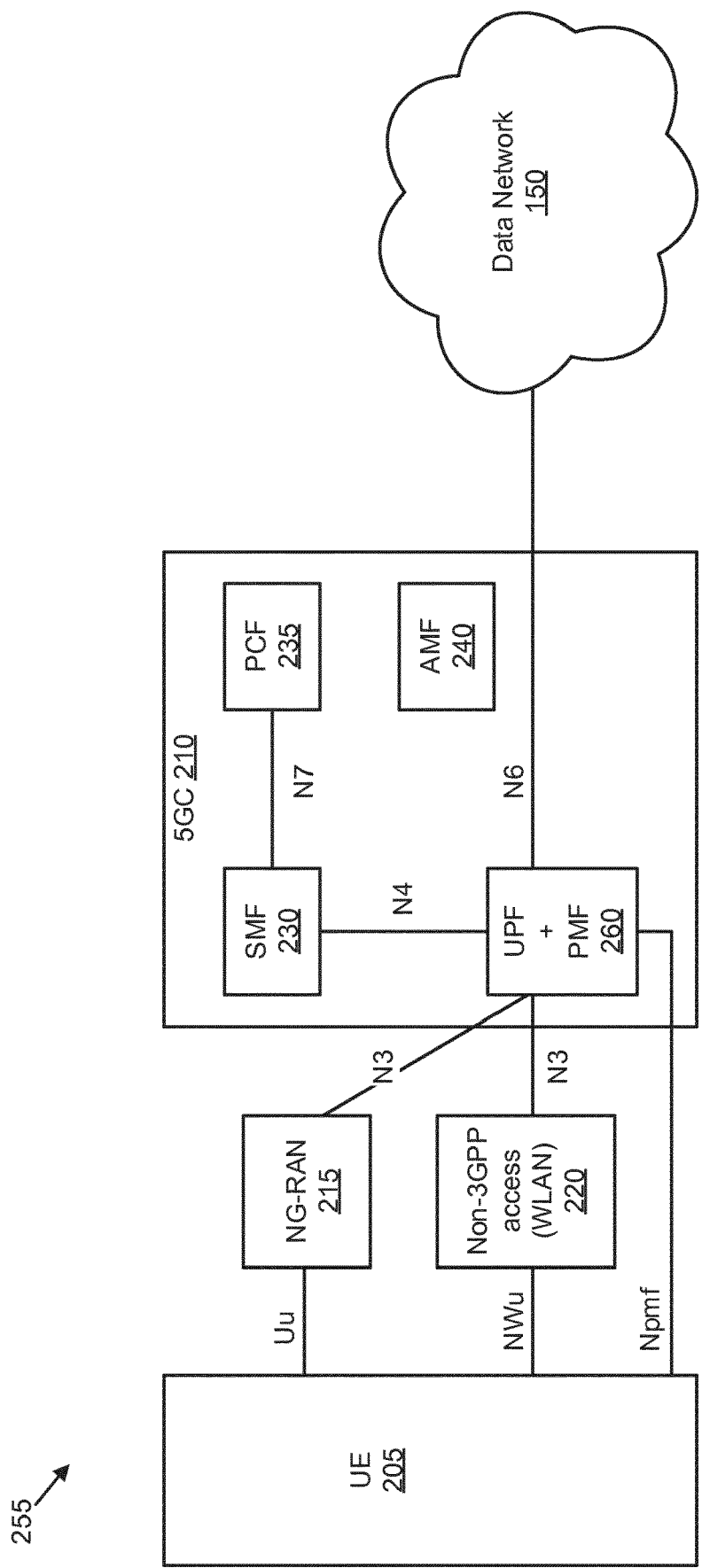
FIG. 2C is a block diagram illustrating a third embodiment of a network architecture for measuring access network performance parameters for a multi-access data connection.

FIG. 2C depicts a third network architecture 255 used for measuring access network performance parameters for a multi-access data connection, according to embodiments of the disclosure. The third network architecture 255 may be a simplified embodiment of the wireless communication system 100. As depicted, the third network architecture 255 also includes a UE 205 that communicates with a UPF 225 in a 5G core network ("5GC") 210 via both a 5G RAN 215 and a Non-3GPP Access Network 220, such as a WLAN. Here, the UE 205 has established a multi-access data connection with the 5GC 210 having a first user-plane connection (e.g., child PDU session) over the 5G RAN 215 and a second user-plane connection over the Non-3GPP Access Network 220. The two user-plane connections share the same IP address and compose a multi-link data connection between the UE 205 and the UPF 225.

In third network architecture 255, the PMF is integrated into the UPF, shown here as the combined function "UPF+PMF" 260. Here, the SMF 230 interacts with the PMF (e.g., the UPF+PMF 260) via the existing "N4" interface. Note that the third network architecture 255 does not require a "N5" interface between the PCF 235 and PMF 245.

The UE 205 may communicate with the PMF (e.g., the UPF+PMF 260) over the user plane, using either 5G RAN 215 (e.g., 3GPP access) or Non-3GPP Access Network 220. Again, the Npmf interface is used to support measurement sessions between the UE 205 and PMF, and to measure ANP parameters such as Throughput, Delay and Loss Rate. The UE 205 is configured with a Measurement Assistance policy, created by PCF 235, which defines how the UE 205 is to measure certain parameters on the 3GPP and non-3GPP accesses.

After establishing the MA-PDU session, the UE 205 employs the received Measurement Assistance policy to initiate measurement sessions with the UPF+PMF 260 and to determine the ANP parameters of the 5G RAN 215 and Non-3GPP Access Network 220 (e.g., the 3GPP and non-3GPP accesses). As mentioned, the UE 205 applies the ATSSS rules after performing a measurement session to estimate the ANP parameters on each access.

In the third network architecture 255, the PMF is able to send ANP parameters directly to the UPF (due to the PMF being collocated with the UPF) wherein the UPF applies one or more Packet Detection Rules (PDRs) using the relevant ANP parameters provided by the PMF.

Figure 3:
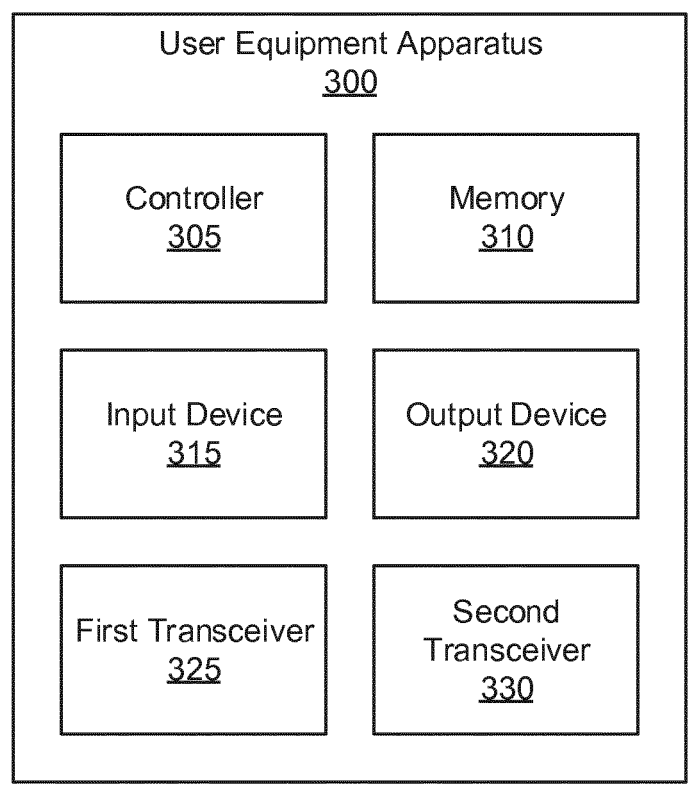
FIG. 3 is a schematic block diagram illustrating one embodiment of a user equipment apparatus for measuring access network performance parameters for a multi-access data connection.

FIG. 3 depicts one embodiment of a user equipment apparatus 300 that may be used for measuring access network performance parameters for a multi-access data connection, according to embodiments of the disclosure. The user equipment apparatus 300 may be one embodiment of the remote unit 105. Furthermore, the user equipment apparatus 300 may include a processor 305, a memory 310, an input device 315, an output device 320, a first transceiver 325, and a second transceiver 330.

The first transceiver 325 communicates with a mobile communication network (e.g., the mobile core network 140) over a first access network, while the second transceiver 330 communicates with the mobile communication network over a second access network. The first and second access networks facilitate communication between the mobile core network 140 and the user equipment apparatus 300. In one embodiment, the first access network is the 5G RAN 215 or other 3GPP access network 120 and the second access network is the non-3GPP access network 220 or other non-3GPP access network 130. In another embodiment, the second access network is the 5G RAN 215 or other 3GPP access network 120 and the first access network is the non-3GPP access network 220 or other non-3GPP access network 130. In other embodiments, the first access network and second access network may be other types of access networks, the first access network being a different type of access network than the second. Each transceiver 325, 330 may include at least one transmitter and at least one receiver. Additionally, the transceivers 325, 330 may support at least one network interface, such as an "Uu" interface used for communications between a remote unit 105 and the 3GPP access network 120.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, the first transceiver 325, and the second transceiver 330.

In various embodiments, the processor 305 establishes a multi-access data connection, for example a MA-PDU, with a mobile communication network over a first access network (e.g., a 3GPP access network) and a second access network (e.g., a non-3GPP access network). Moreover, the processor 305 receives measurement assistance information. In certain embodiments, establishing the multi-access data connection includes the user equipment apparatus 300 transmitting a PDU session establishment request containing an indication that the user equipment apparatus 300 supports access network performance measurements. In such embodiments, receiving measurement assistance information may include receiving a PDU session establishment accept message containing the measurement assistance information.

In other embodiments, the processor 305 transmits an indication that the user equipment apparatus 300 supports access network performance measurements, said transmission included in a registration procedure with the mobile communication network. In such embodiments, the measurement assistance information may be received separately from the PDU session establishment accept message. In certain embodiments, receiving the measurement assistance information includes the processor 305 receiving a Measurement Assistance policy. In such embodiments, the Measurement Assistance policy includes one or more rules, each rule indicating measurement assistance information for an access network.

In various embodiments, the measurement assistance information may include one or more of: a network address of a PMF for measuring the at least one ANP parameter, a port of the PMF for measuring the at least one ANP parameter, an amount of data to transmit for measuring the at least one ANP parameter (e.g., a maximum number of bytes to transmit during a measurement session), a protocol for measuring the at least one ANP parameter (e.g., TCP, UDP, etc.), a measurement duration (e.g., a maximum duration or a measurement session), and a measurement interval (e.g., how frequently the user equipment apparatus 300 is to attempt to initiate a measurement session on a specific access network). Note that the PMF may be a standalone function (as depicted in FIG. 1), or a function inside the UPF (e.g., UPF-A 143).

In various embodiments, the at least one ANP parameter comprises at least one of: a throughput on the first access network, an amount of delay on the first access network, a loss rate of the first access network, a throughput on the second access network, an amount of delay on the second access network, and a loss rate of the second access network.

The processor 305 measures at least one ANP parameter using the measurement assistance information. In some embodiments, the processor 305 detects data to be sent on one of the access networks of the multi-access data connection. In one embodiment, the processor 305 may suspend measurement of at least one ANP parameter on the first access network in response to detecting data to be sent on the first access network of the multi-access data connection. In another embodiment, the processor 305 may suspend measurement of at least one ANP parameter on the second access network in response to detecting data to be sent on the multi-access data connection via the second access network.

In some embodiments, the processor 305 determines whether a transmission buffer is empty. The user equipment apparatus 300 includes at least a first transmission buffer associated with one of the first access network and a second transmission buffer associated with the second access network. In such embodiments, measuring the at least one ANP parameter includes measuring the at least one ANP parameter over one of the first access network and the second access network in response to the corresponding transmission buffer being empty.

In some embodiments, the processor 305 receives a set of traffic steering rules (e.g., ATSSS rules) from the mobile communication network, at least one rule in the set of traffic steering rules including a particular ANP parameter. In such embodiments, measuring the at least one ANP parameter includes measuring only the particular ANP parameter. The processor 305 applies a traffic steering rule to uplink data traffic. Here, the traffic steering rule indicates to which of the first and second access networks the uplink data traffic is to be routed based on the measured at least one ANP parameter.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media. In some embodiments, the memory 310 stores data relating to measuring ANP parameters for a multi-access data connection, for example storing ANP parameters, access measurement policies, ATSSS policies, PDU Session IDs, and the like. In certain embodiments, the memory 310 also stores program code and related data, such as an operating system ("OS") or other controller algorithms operating on the user equipment apparatus 300 and one or more software applications.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The output device 320, in one embodiment, may include any known electronically controllable display or display device. The output device 320 may be designed to output visual, audible, and/or haptic signals. In some embodiments, the output device 320 includes an electronic display capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, all or portions of the output device 320 may be located near the input device 315.

As discussed above, the first transceiver 325 communicates with a mobile communication network via a first access network, while the second transceiver 330 communicates with the mobile communication network via a second access network. The transceivers 325 and 330 operate under the control of the processor 305 to transmit messages, data, and other signals and also to receive messages, data, and other signals. For example, the processor 305 may selectively activate one or both of the transceivers 325, 330 (or portions thereof) at particular times in order to send and receive messages. The first transceiver 325 may include one or more transmitters and one or more receivers for communicating over the first access network. Similarly, the second transceiver 330 may include one or more transmitters and one or more receivers for communicating over the second access network. As discussed above, the first transceiver 325 and the second transceiver 330 may support one or more the network interfaces for communicating with the mobile communication network.

Figure 4:
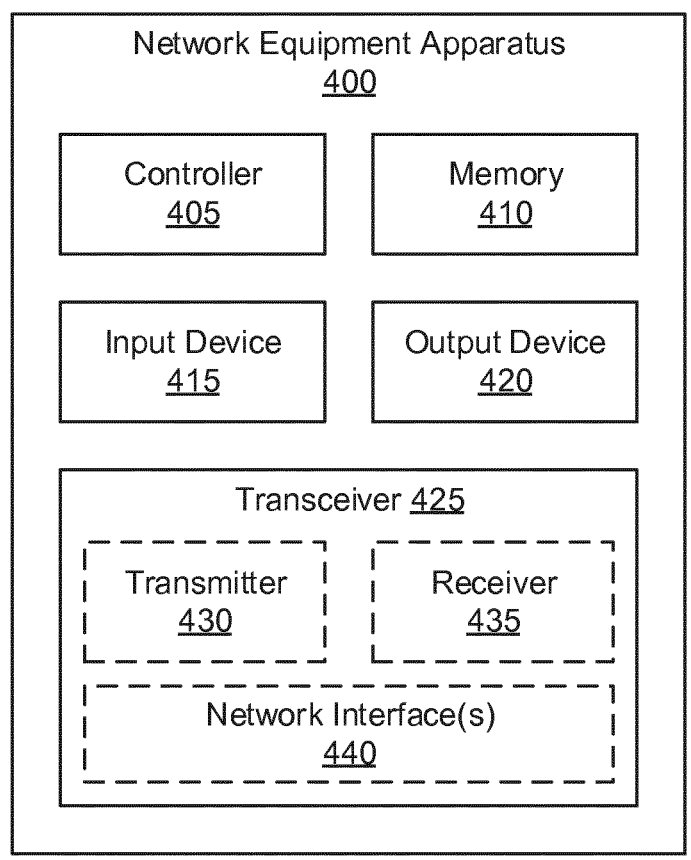
FIG. 4 is a schematic block diagram illustrating one embodiment of a network equipment apparatus for measuring access network performance parameters for a multi-access data connection.

FIG. 4 depicts one embodiment of a network equipment apparatus 400 that may be used for measuring access network performance parameters for a multi-access data connection, according to embodiments of the disclosure. In some embodiments, the network equipment apparatus 400 may be one embodiment of the PCF 148 and/or PCF 235. In other embodiments, the network equipment apparatus 400 may be one embodiment of the SMF 146 and/or SMF 230. In yet other embodiments, the network equipment apparatus 400 may be a PMF (e.g., the PMF 147 and/or PMF 245) or a combined UPF/PMF (e.g., the UPF+PMF 260).

Furthermore, the network equipment apparatus 400 may include a processor 405, a memory 410, an input device 415, an output device 420, and a transceiver 425. In some embodiments, the input device 415 and the output device 420 are combined into a single device, such as a touchscreen. In certain embodiments, the network equipment apparatus 400 may not include any input device 415 and/or output device 420.

As depicted, the transceiver 425 includes at least one transmitter 430 and at least one receiver 435. Additionally, the transceiver 425 may support at least one network interface 440, such as an ""N7" interface used for communications between a session management function (e.g., the SMF 146) and a policy control function (e.g., the PCF 148), an "N4" interface used for communications between a SMF and a UPF, an "N5" interface used for communications between a PCF and a PMF, and the like.

The processor 405, in one embodiment, may include any known controller capable of executing computer-readable instructions and/or capable of performing logical operations. For example, the processor 405 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425.

Where the network equipment apparatus 400 operates as a PCF, the processor 405 receives, from a network function (e.g., from a session management function, such as the SMF 146), a policy request message (e.g., a Session Management ("SM") Policy Control Create Request message) in response to a remote unit requesting a multi-access data connection (e.g., a MA-PDU session) with a mobile communication network over a first access network (e.g., a 3GPP access network) and a second access network (e.g., a non-3GPP access network). Here, the policy request message indicates that the remote unit (e.g., the UE 205) supports access network performance measurements.

The processor 405 derives at least one Traffic Steering rule that contains an Access Network Performance ("ANP") parameter. Here, the Traffic Steering rule indicates to which of the first and second access networks the data traffic of the multi-access data connection is to be routed according to a measure value of the ANP parameter. Note that an SMF (e.g., SMF 146 and/or SMF 230) uses the Traffic Steering rule to form ATSSS rules which are sent to the remote unit (e.g., the remote unit 105 and/or the UE 205). In various embodiments, the (at least one) ANP parameter may be one of: a throughput on the first access network, an amount of delay on the first access network, a loss rate of the first access network, a throughput on the second access network, an amount of delay on the second access network, and a loss rate of the second access network.

In various embodiments, the processor 405 determines measurement assistance information for the remote unit corresponding to the at least one Traffic Steering rule that contains an ANP parameter. In some embodiments, the measurement assistance information is in the form of one or more Measurement Assistance policy rules. In various embodiments, the measurement assistance information may include one or more of: a network address of a PMF for measuring the at least one ANP parameter, a port of the PMF for measuring the at least one ANP parameter, an amount of data to transmit for measuring the at least one ANP parameter (e.g., a maximum number of bytes to transmit during a measurement session), a protocol for measuring the at least one ANP parameter (e.g., TCP, UDP, etc.), a measurement duration (e.g., a maximum duration or a measurement session), and a measurement interval (e.g., how frequently the remote unit is to attempt to initiate a measurement session on a specific access network).

The processor 405 controls the transceiver 425 to return to the requesting network function (e.g., the SMF) the at least one Traffic Steering rule that contains an ANP parameter and the corresponding measurement assistance information (e.g., in a Measurement Assistance policy), in response to the policy request message. In certain embodiments, returning the at least one Traffic Steering rule that contains an ANP parameter comprises returning a Measurement Assistance policy, the Measurement Assistance policy including one or more Measurement Assistance policy rules, each Measurement Assistance policy rule indicating measurement assistance information for an access network.

In some embodiments, the processor 405 further selects a PMF for communicating data used to measure the at least one ANP parameter. In such embodiments, the processor 405 also reserves measurement resources for the remote unit at the PMF. In certain embodiments, the measurement resources include part of the measurement assistance information, e.g. the PMF address, port, protocol, etc. Here, the processor 405 also determines measurement assistance information for the remote unit based on the reserved measurement resources. Note that the PMF may be a stand-alone function inside the mobile core network (as depicted in FIG. 1), outside the mobile core network (e.g., as depicted in FIGS. 2A and 2B), or be a function inside the UPF (e.g., as depicted in FIG. 2C).

In some embodiments, the processor 405 further receives at least one measured ANP parameter for one of the first access network and second access network from a PMF. In such embodiments, the processor 405 forwards the at least one measured ANP parameter to the network function. Here, the mobile communication network uses the at least one measured ANP parameter to select one of the first access network and second access network for delivering downlink traffic to the remote unit.

Where the network equipment apparatus 400 operates as a SMF, the processor 405 receives, from a network function (e.g., from an AMF, such as the AMF 240), a session management request message (e.g., a Create SM Contest Request message) in response to a remote unit requesting a multi-access data connection (e.g., a MA-PDU session) with a mobile communication network over a first access network (e.g., a 3GPP access network) and a second access network (e.g., a non-3GPP access network). Here, the session management request message indicates that the remote unit (e.g., the UE 205) supports access network performance measurements.

The processor 405 controls the transceiver to send a policy request message (e.g., a SM Policy Control Create Request message) to a PCF, the policy request message including indications that the remote unit requests a multi-access data connection and supports access network performance measurements. The processor 405 receives a policy response message (e.g., a SM Policy Control Create Response message) from the PCF, the policy response message including a set of PCC rules that contains at least one Traffic Steering rule that contains an Access Network Performance ("ANP") parameter. Here, the at least one Traffic Steering rule indicates to which of the first and second access networks the data traffic of the multi-access data connection is to be routed according to a measured value of the ANP parameter. The processor 405 determines measurement assistance information for the remote unit corresponding to the at least one Traffic Steering rule that contains an ANP parameter. In some embodiments, the measurement assistance information is in the form of one or more Measurement Assistance policy rules. Further, the processor 405 may also derive ATSSS rules for the remote unit and Packet Detection Rules for a user plane function based on Traffic Steering rules in the PCC rules received from the PCF. Here, the PCC rules contain the at least one Traffic Steering rule that contains an ANP parameter. Moreover, the PCC rules may also contain one or more Traffic Steering rules that do not contain an ANP parameter. Accordingly, the ATSSS rules may include traffic steering rules that contain an ANP parameter and traffic steering rules that do not contain an ANP parameter.

The processor 405 controls the transceiver 425 to send to the remote unit an accept message containing steering rules for the remote unit (i.e. ATSSS rules) and the determined measurement assistance information (e.g., in a Measurement Assistance policy), in response to the session management request message. In certain embodiments, sending to the remote unit an accept message containing steering rules for the remote unit (i.e. ATSSS rules) and the determined measurement assistance information includes returning a Measurement Assistance policy, the Measurement Assistance policy including one or more Measurement Assistance policy rules, each Measurement Assistance policy rule indicating measurement assistance information for an access network.

In some embodiments, the processor 405 further selects a PMF for communicating data used to measure the at least one ANP parameter. In such embodiments, the processor 405 also reserves measurement resources for the remote unit at the PMF.

In some embodiments, the processor 405 further receives at least one measured ANP parameter for one of the first access network and second access network from a PMF. In such embodiments, the processor 405 forwards the at least one measured ANP parameter to a user plane function. Here, the mobile communication network uses the at least one measured ANP parameter to select one of the first access network and second access network for delivering downlink traffic to the remote unit.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media. In some embodiments, the memory 410 stores data relating to measuring ANP parameters for a multi-access data connection, for example storing access measurement policies, ATSSS policies, ANP parameters, Traffic Steering rules, and the like. In certain embodiments, the memory 410 also stores program code and related data, such as an operating system ("OS") or other controller algorithms operating on the network equipment apparatus 400 and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, all or portions of the output device 420 may be located near the input device 415.

The transceiver 425 communicates with one or more network functions of a mobile communication network. The transceiver 425 operates under the control of the processor 405 to transmit messages, data, and other signals and also to receive messages, data, and other signals. For example, the processor 405 may selectively activate the transceiver (or portions thereof) at particular times in order to send and receive messages. The transceiver 425 may include one or more transmitters 430 and one or more receivers 435. As discussed above, the transceiver 425 may support one or more the network interface 440 for communicating with network functions in a mobile core network.

Figure 5A:
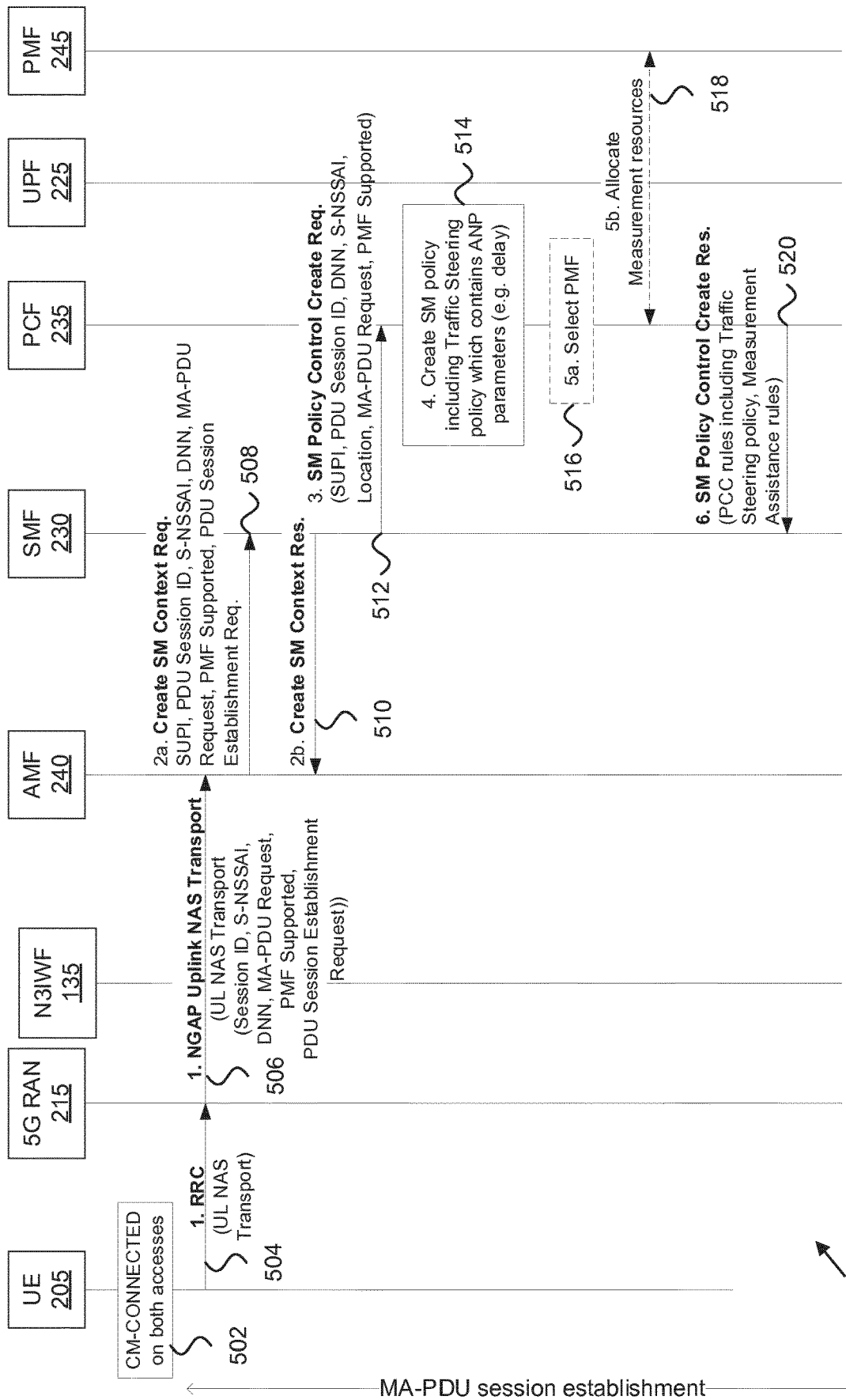
FIG. 5A is a block diagram illustrating one embodiment of a procedure for measuring access network performance parameters of a multi-access data connection.
Figure 5B:
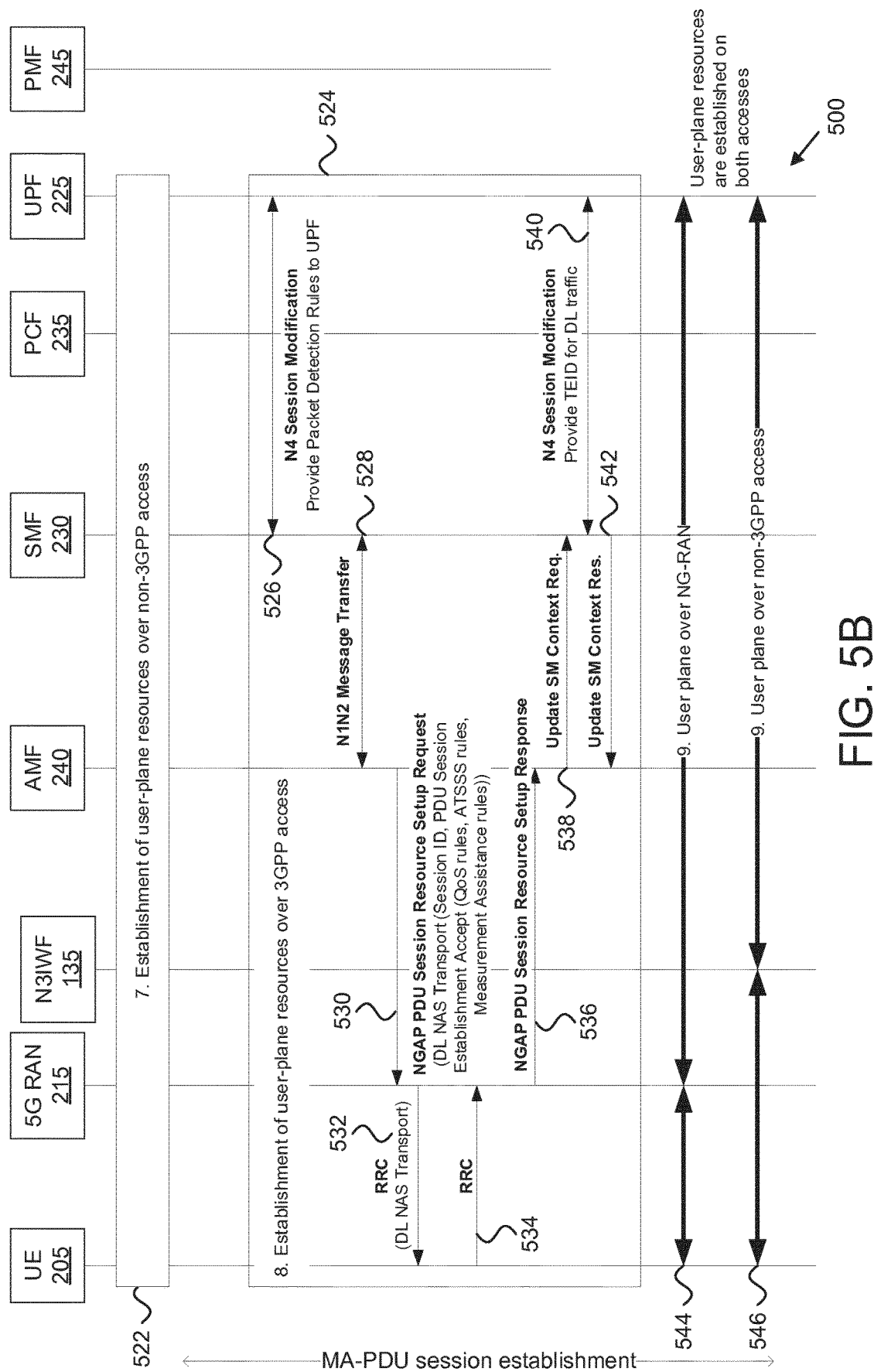
FIG. 5B is a block diagram is a continuation of the procedure of FIG. 5A.
Figure 5C:
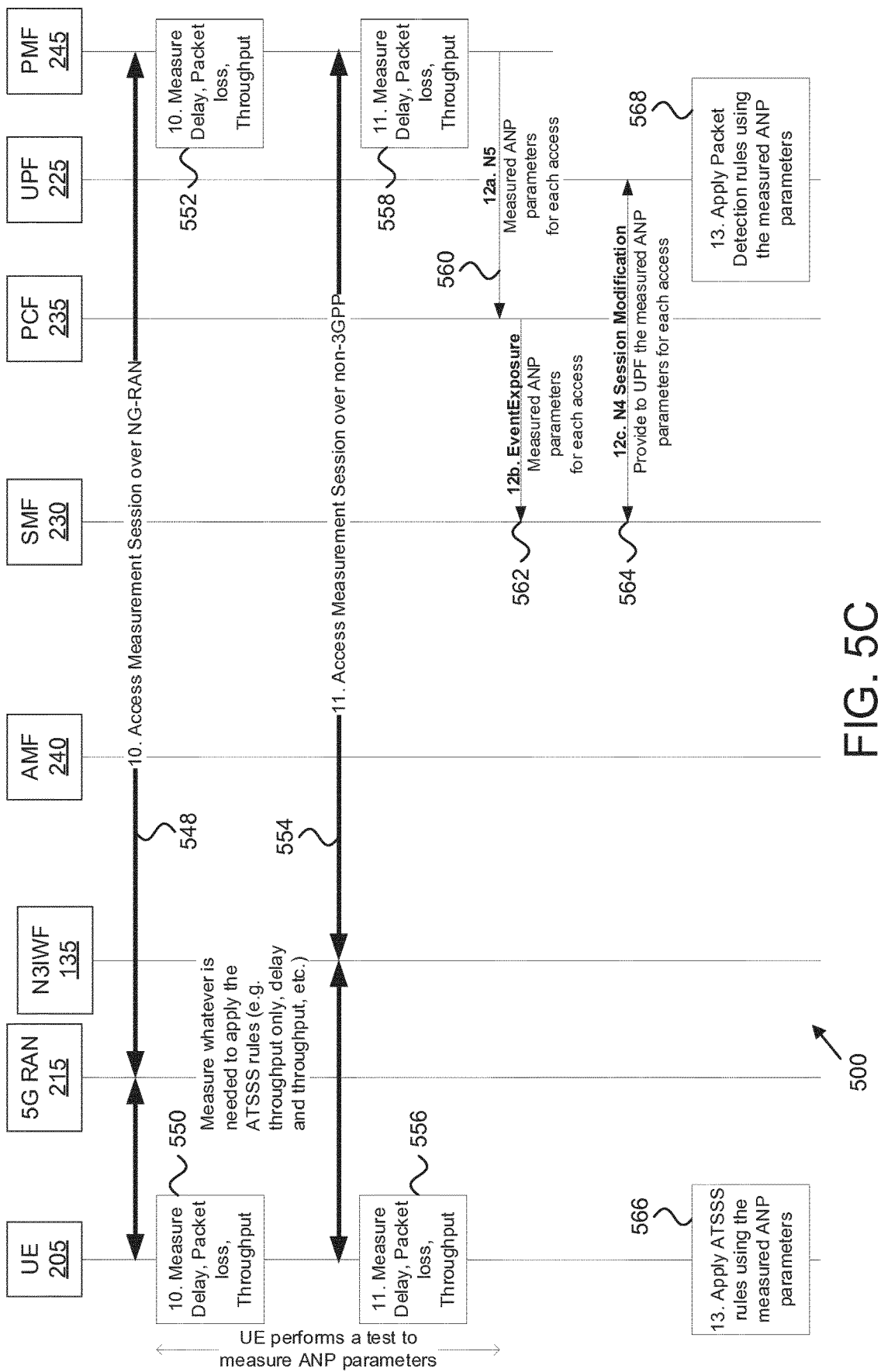
FIG. 5C is a block diagram is a continuation of the procedure of FIG. 5B.

FIGS. 5A-5C depict a first network procedure 500 for measuring access network performance parameters of a multi-access data connection, according to embodiments of the disclosure. The first network procedure 500 involves the UE 205, 5G RAN 215, N3IWF 135, AMF 240, SMF 230, PCF 235, UPF 225, and the PMF 245. In the first network procedure 500, the PCF 235 interacts with the PMF 245 and derives measurement assistance information, as shown in FIG. 2A. The first network procedure 500 begins with the UE 205 entering the CM-CONNECTED state for both the 5G RAN 215 and the Non-3GPP Access Network 220 (see block 502).

The UE 205 requests a MA-PDU session by sending a NAS message (e.g., a UL NAS Transport message) to the AMF 240 including a PDU Session Establishment Request. In the depicted embodiment, the UE 205 requests the MA-PDU session via the 5G RAN 215 by sending an RRC message containing the UL NAS Transport message (see communication 504) and the 5G RAN 215 sends a NGAP UL NAS Transport message to the AMF 240 (see communication 506).

The NAS message includes a MA-PDU Request indication, which indicates that the request is for the establishment of a multi-access PDU session. Additionally, the NAS message also includes a PMF Supported indication, which indicates that the UE 205 supports Access Measurements by using a performance measurement function (here, the PMF 245).

Note that in certain embodiments, the UE 205 may send a PMF Supported indication to the AMF 240 during a Registration procedure. In such embodiments, the UE 205 would not include the PMF Supported indication in step 1, because the indication has already been sent to the AMF 240. In such embodiments, the AMF 240 adds the PMF Supported indication to the UE Context of the UE 205.

Returning to FIG. 5A, the AMF 240 sends a session management ("SM") request message (here a Create SM Context Request message) to the SMF 230 (see communication 508). Note that the SM request message includes the PMF Supported indication. In situations where the AMF 240 received the PMF Supported indication during a UE registration procedure, the AMF 240 includes the PMF Supported indication at every PDU Session Establishment request.

The SMF 230 sends a SM response message (here a Create SM Context Response message) to the AMF 240 (see communication 510) and forwards the PMF Supported indication to PCF 235 when the SMF 230 requests SM policy for the PDU session (see communication 512).

The PCF 235 derives the SM policy for the MA-PDU session, which includes Traffic Steering policy that specifies how traffic should be routed between the two accesses of the MA-PDU session (see block 514). When deriving the Traffic Steering policy, the PCF 235 takes into account the SMF Supported indication received from the SMF 230. If this indication is received, then the PCF 235 may derive Traffic Steering rules that depend on ANP parameters, e.g., rules of the form "Steer traffic of App-x to the access with the largest Throughput". However, if this indication is not received, then the PCF 235 only derives Traffic Steering rules that do not depend on ANP parameters.

In certain embodiments, the PCF 235 selects a PMF 245 (see block 516) and then requests from the selected PMF 245 to reserve resources required to support the measurements initiated by the UE 205 (see communication 518). In some embodiments, reserving such resources includes instantiating a process in the PMF 245 which awaits for the measurements requests from the UE 205. In certain cases, the resource reservation in the PMF 245 may not be required and so the PCF 235 does not need to select the PMF 245 and request measurement resource allocation. In such cases, the PMF 245 does not use dedicated measurement resources for each UE 205, but uses the same measurement resources shared by all UEs 205.

If the PCF 235 derives one or more Traffic Steering rules that depend on ANP parameters, then the PCF 235 also derives Measurement Assistance Policy rules, which assist the UE 205 in conducting ANP measurements. After deriving the Traffic Steering rules and corresponding Measurement Assistance Policy rules, the PCF 235 sends to the SMF 230 the created SM policy for the MA-PDU session, which includes PCC rules containing the derived Traffic Steering rules and the Measurement Assistance Policy rules (see communication 520). Note that the SMF 230 uses the traffic steering rules in the PCC rules to create an ATSSS policy having one or more ATSSS rules.

Continuing at FIG. 5B, the SMF 230 initiates the establishment of user-plane resources over the non-3GPP access, e.g., as specified in 3GPP TS 23.502 and according to the MA-PDU session establishment procedure (see block 522). During this step, the UE 205 does not receive a PDU Session Establishment Accept message.

After establishing user-plane resources over the non-3GPP access, the SMF 230 initiates the establishment of user-plane resource over the 3GPP access (see block 524). While similar to the establishment of user-plane resources over the non-3GPP access, this step is shown in more details because in this step the UE receives Measurement Assistance Policy rules. Note that the SMF 230 provides Packet Detection rules to the UPF 225 (see communication 526). As described above, the Packet Detection rules may also refer to specific ANP parameters and are used by the UPF 225 to determine how the downlink traffic of the MA-PDU session is to be distributed across the 3GPP and non-3GPP accesses.

The SMF 230 invokes the N1N2 Message Transfer operation (e.g., the Namf_Communication_N1N2MessageTransfer service operation) to the AMF 240, here to establish the user plane resources over 3GPP access for the MA-PDU session (see communication 528). The AMF 240 sends a NAS message to the UE 205 via the 5G RAN 215, here a DL NAS Transport message (see communications 530 and 532). The NAS message includes a PDU Session Establishment Accept message, which in turn contains (a) the Measurement Assistance Policy rules provided by PCF and (b) the ATSSS rules, which are created by the SMF 230 by using the Traffic Steering rules provided by the PCF 235. Based on the Traffic Steering rules received from PCF 235, the SMF 230 also derives the Packet Detection rules which are sent to the UPF 225 (refer to communication 526). The UE 205 sends a PDU setup response message (see communications 534 and 536) to the AMF 240 via the 5G RAN 215 and the AMF 240 updates the SM context with the SMF 230 (see communications 538 and 542). Note that the SMF 230 also updates the UPF 225 (see communication 540). At this point, the user-plane resources on both accesses have been reserved and, thus, the UE 205 can send and receive PDU session traffic (i.e. user data) over both the 5G RAN 215 (see communications 544) and the non-3GPP access (via the N3IWF 135, see communications 546).

Continuing at FIG. 5C, the UE 205 (possibly before sending any PDU session traffic) starts a measurement session over 3GPP access (e.g., the 5G RAN 215, see communication 548) and also starts a measurement session over non-3GPP access (see communication 554). These measurement sessions may be conducted in parallel and utilize the information included in the Measurement Assistance policy provided to UE 205. As noted above, a measurement session may use the iPerf tool for the estimation of the ANP parameters could be used, in which case, the PMF 245 would act as an iPerf server and the UE 205 would act as an iPerf client. In certain embodiments, a dedicated iPerf server function may be instantiated for each UE 205. In other embodiments, a shared iPerf server function may be used to serve all UEs 205. Further, the UE 205 may use the parameters in the received Measurement Assistance Policy rules to configure the operation of the iPerf client, e.g., to define the address of the iPerf server, the port of the iPerf server, the protocol to use, the number of bytes to transmit, etc.

The UE 205 measures the ANP parameters specified in the received Measurement Assistance Policy rules, such as Throughput, Delay, Packet Loss Rate, etc. for both the 3GPP access (see block 550) and the non-3GPP access (see block 556). Likewise, the PMF 245 measures the same ANP parameters for both the 3GPP access (see block 552) and the non-3GPP access (see block 558). Thus, during each measurement session, one or more ANP parameters are measured by the UE 205 and by the PMF 245 (and both measure the same values).

Where the PMF 245 is a standalone network function, as depicted in FIG. 2A, the PMF 245 must communicate the ANP parameters to the UPF 225 for implementing the Packet Detection Rules. In the depicted embodiment, the PMF 245 does not have direct access to the UPF 225, thus the PMF 245 forwards the values of the measured ANP parameters to the PCF 235, which values are then sent to the UPF 225 via the SMF 230 (see communications 560, 562, and 564).

The UE 205 and the UPF 225 now use the same values of the measured ANP parameters to decide how to route the uplink and the downlink traffic respectively across the two accesses of the MA-PDU session. These decisions are taken by using the ATSSS rules in the UE 205 (see block 566) and the Packet Detection rules in the UPF 225 (see block 568). The first network procedure 500 ends.

Figure 6A:
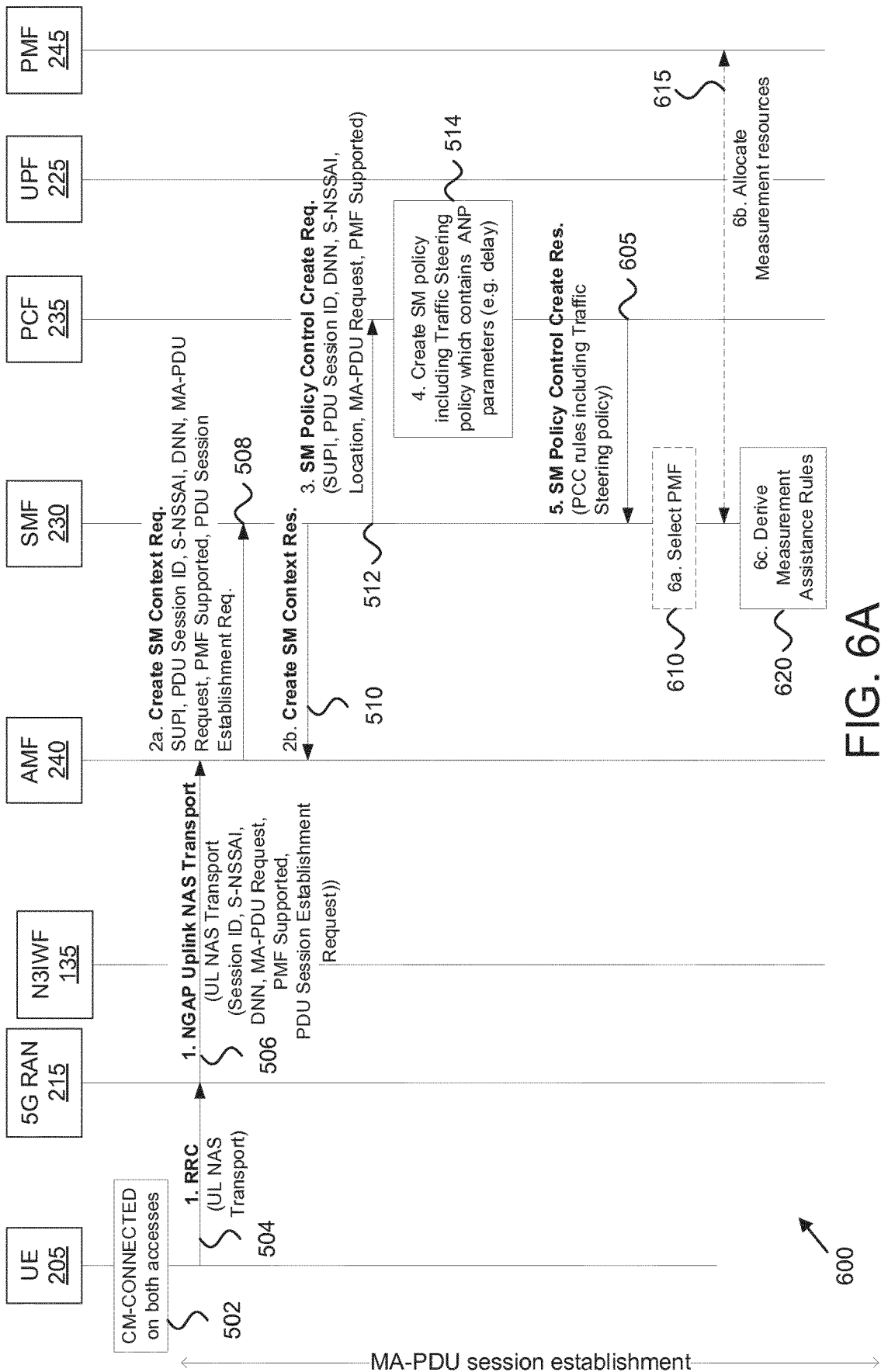
FIG. 6A is a block diagram illustrating another embodiment of a procedure for measuring access network performance parameters of a multi-access data connection.
Figure 6B:
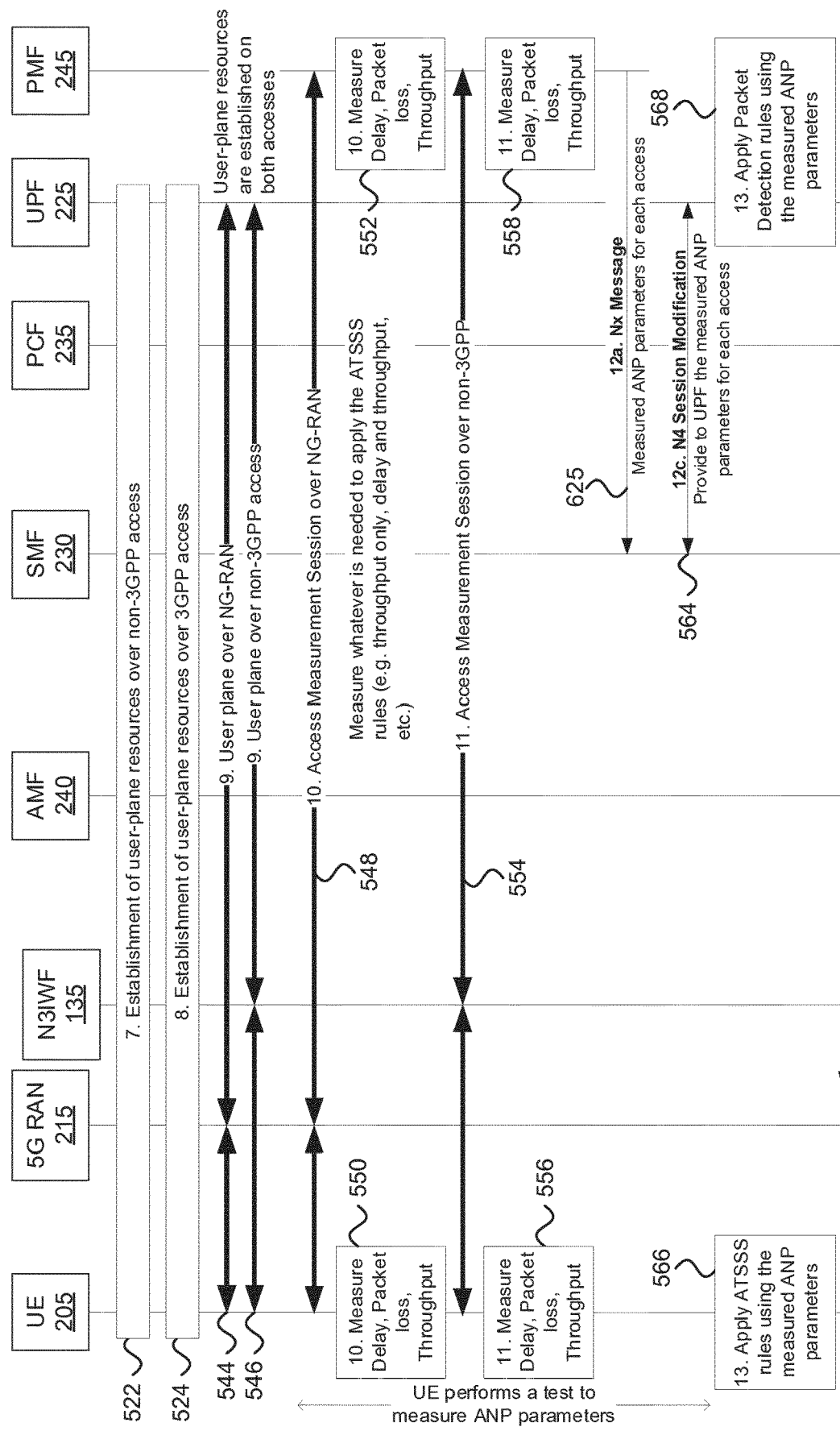
FIG. 6B is a block diagram is a continuation of the procedure of FIG. 6A.

FIGS. 6A-6B depict a second network procedure 600 for measuring access network performance parameters of a multi-access data connection, according to embodiments of the disclosure. In the second network procedure 600, the SMF 230 interacts with the PMF 245 and derives measurement assistance information, as shown in FIG. 2B. The second network procedure 600 involves the UE 205, 5G RAN 215, N3IWF 135, AMF 240, SMF 230, PCF 235, UPF 225, and the PMF 245. The second network procedure 600 begins with the UE 205 entering the CM-CONNECTED state for both the 5G RAN 215 and the Non-3GPP Access Network 220 (see block 502).

The UE 205 requests the MA-PDU session via the 5G RAN 215 by sending an RRC message containing the UL NAS Transport message (see communication 504) and the 5G RAN 215 sends a NGAP UL NAS Transport message to the AMF 240 (see communication 506).

The NAS message includes a MA-PDU Request indication, which indicates that the request is for the establishment of a multi-access PDU session. Additionally, the NAS message also includes a PMF Supported indication, which indicates that the UE 205 supports Access Measurements by using a performance measurement function (here, the PMF 245).

The AMF 240 sends a SM request message (here a Create SM Context Request message) to the SMF 230 (see communication 508). Note that the SM request message includes the PMF Supported indication. The SMF 230 sends a SM response message (here a Create SM Context Response message) to the AMF 240 (see communication 510) and forwards the PMF Supported indication to PCF 235 when the SMF 230 requests SM policy for the PDU session (see communication 512).

The PCF 235 derives the SM policy for the MA-PDU session, which includes Traffic Steering policy that specifies how traffic should be routed between the two accesses of the MA-PDU session (see block 514). When deriving the Traffic Steering policy, the PCF 235 takes into account the SMF Supported indication received from the SMF 230. If this indication is received, then the PCF 235 may derive Traffic Steering rules that depend on ANP parameters, e.g., rules of the form "Steer traffic of App-x to the access with the largest Throughput". However, if this indication is not received, then the PCF 235 only derives Traffic Steering rules that do not depend on ANP parameters.

After deriving the Traffic Steering rules, the PCF 235 sends to the SMF 230 the created SM policy for the MA-PDU session, which includes PCC rules containing the derived Traffic Steering rules (see communication 605). Note that the SMF 230 uses the traffic steering rules in the PCC rules to create an ATSSS policy having one or more ATSSS rules.

In certain embodiments, the SMF 230 selects a PMF 245 (see block 610) and then requests from the selected PMF 245 to reserve resources required to support the measurements initiated by the UE 205 (see communication 615). In some embodiments, reserving such resources includes instantiating a process in the PMF 245 which awaits for the measurements requests from the UE 205. In certain cases, the resource reservation in the PMF 245 may not be required and so the SMF 230 does not need to select the PMF 245 and request measurement resource allocation. In such cases, the PMF 245 does not use dedicated measurement resources for each UE 205, but uses the same measurement resources shared by all UEs 205. If the PCF 235 derives one or more Traffic Steering rules that contain ANP parameters, then the SMF 230 derives Measurement Assistance Policy rules, which assist the UE 205 in conducting ANP measurements (see block 620).

Continuing at FIG. 6B, the SMF 230 initiates the establishment of user-plane resources over the non-3GPP access, e.g., as specified in 3GPP TS 23.502 and according to the MA-PDU session establishment procedure (see block 522). During this step, the UE 205 does not receive a PDU Session Establishment Accept message.

After establishing user-plane resources over the non-3GPP access, the SMF 230 initiates the establishment of user-plane resource over the 3GPP access (see block 524). The steps for establishment of user-plane resource over the 3GPP access are described above with reference to FIG. 5B. Notable, during establishment of user-plane resource over the 3GPP access the UE 205 receives a PDU Session Establishment Accept message including the Traffic Steering rules and Measurement Assistance information (e.g., Traffic Steering Policy and Measurement Assistance Policy). At this point, the user-plane resources on both accesses have been reserved and, thus, the UE 205 can send and receive PDU session traffic (i.e. user data) over both the 5G RAN 215 (see communications 544) and the non-3GPP access (via the N3IWF 135, see communications 546).

Further, the UE 205 (possibly before sending any PDU session traffic) starts a measurement session over 3GPP access (e.g., the 5G RAN 215, see communication 548) and also starts a measurement session over non-3GPP access (see communication 554). These measurement sessions may be conducted in parallel and utilize the information included in the Measurement Assistance policy provided to UE 205.

The UE 205 measures the ANP parameters specified in the received Measurement Assistance Policy rules, such as Throughput, Delay, Packet Loss Rate, etc. for both the 3GPP access (see block 550) and the non-3GPP access (see block 556). Likewise, the PMF 245 measures the same ANP parameters for both the 3GPP access (see block 552) and the non-3GPP access (see block 558). Thus, during each measurement session, one or more ANP parameters are measured by the UE 205 and by the PMF 245 (and both measure the same values).

Where the PMF 245 is a standalone network function, as depicted in FIG. 2B, the PMF 245 must communicate the ANP parameters to the UPF 225 for implementing the Packet Detection Rules. In the depicted embodiment, the PMF 245 does not have direct access to the UPF 225, thus the PMF 245 forwards the values of the measured ANP parameters to the SMF 230, which values are then sent to the UPF 225 (see communications 625 and 564).

The UE 205 and the UPF 225 now use the same values of the measured ANP parameters to decide how to route the uplink and the downlink traffic respectively across the two accesses of the MA-PDU session. These decisions are taken by using the ATSSS rules in the UE 205 (see block 566) and the Packet Detection rules in the UPF 225 (see block 568). The second network procedure 600 ends.

Figure 7:
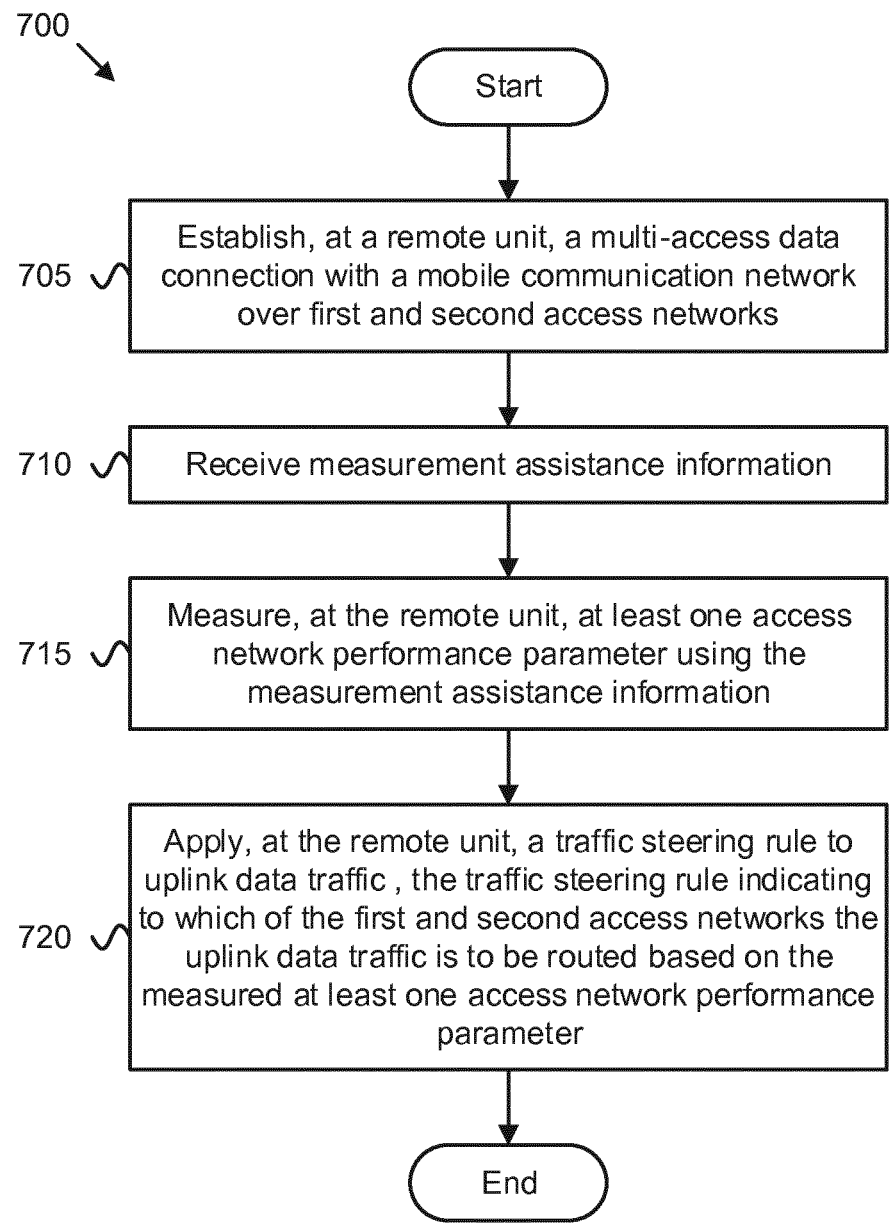
FIG. 7 is a flow chart diagram illustrating one embodiment of a method for measuring access network performance parameters for a multi-access data connection.

FIG. 7 depicts a method 700 for measuring access network performance parameters for a multi-access data connection, according to embodiments of the disclosure. In some embodiments, the method 700 is performed by an apparatus, such as the remote unit 105, the UE 205, and/or the user equipment apparatus 300. In certain embodiments, the method 700 may be performed by a processor executing program code, for example, a microcontroller, a microprocessor, a CPU, a GPU, an auxiliary processing unit, a FPGA, or the like.

The method 700 begins with establishing 705, at the apparatus, a multi-access data connection with a mobile communication network over a first access network and a second access network. In one embodiment, the multi-access data connection is a MA-PDU session. Here, the first access network and the second access network may include a 3GPP access network (e.g., a 5G-RAN) and a non-3GPP access network (e.g., a WLAN, such as a WI-FI hotspot).

In certain embodiments, establishing 705 the multi-access data connection includes the apparatus transmitting a PDU Session Establishment request containing an indication that the apparatus supports access network performance measurements, the multi-access data connection being a MA-PDU session. In such embodiments, receiving measurement assistance information may include the apparatus receiving a PDU session establishment accept message containing the measurement assistance information.

The method 700 includes receiving 710 measurement assistance information. In certain embodiments, the measurement assistance information includes one or more of: a network address of a PMF for communicating data used to measure the at least one ANP parameter, a port of the PMF for measuring the at least one ANP parameter, an amount of data to transmit for measuring the at least one ANP parameter, a protocol for measuring the at least one ANP parameter, a measurement duration, and a measurement interval.

In certain embodiments, receiving 710 the measurement assistance information includes receiving a Measurement Assistance policy, the Measurement Assistance policy including one or more rules, each rule indicating measurement assistance information for an access network.

The method 700 includes measuring 715, at the apparatus, at least one ANP parameter using the measurement assistance information. In certain embodiments, measuring 715 the ANP parameter includes determining whether a transmission buffer associated with one of the first access network and the second access network is empty, wherein measuring 715 the at least one ANP parameter over one of the first access network and the second access network occurs in response to the corresponding transmission buffer being empty. In certain embodiments, the transmission buffer corresponds to one of the first access network and the second access network. In such embodiments, measuring 715 the at least one ANP parameter may include measuring the at least one ANP parameter for the corresponding one of the first access network and the second access network.

In some embodiments, measuring 715 the ANP parameter includes detecting data to be sent on the first access network of the multi-access data connection and suspending measurement of at least one ANP parameter on the first access network in response to detecting data to be sent on the first access network of the multi-access data connection. In other embodiments, measuring 715 the ANP parameter includes detecting data to be sent on the second access network of the multi-access data connection and suspending measurement of at least one ANP parameter on the second access network in response to detecting data to be sent on the first access network of the multi-access data connection. In various embodiments, the at least one ANP parameter comprises at least one of: a throughput on the first access network, an amount of delay on the first access network, a loss rate of the first access network, a throughput on the second access network, an amount of delay on the second access network, and a loss rate of the second access network.

The method 700 includes applying 720, at the apparatus, a traffic steering rule to uplink data traffic, the traffic steering rule indicating to which of the first and second access networks the uplink data traffic is to be routed based on the measured at least one ANP parameter. In further embodiments, applying 720 includes receiving a set of traffic steering rules from the mobile communication network, the set of traffic steering rules including a particular ANP parameter. In such embodiments, measuring 715 the at least one ANP parameter may include measuring only the particular ANP parameter. The method 700 ends.

Figure 8:
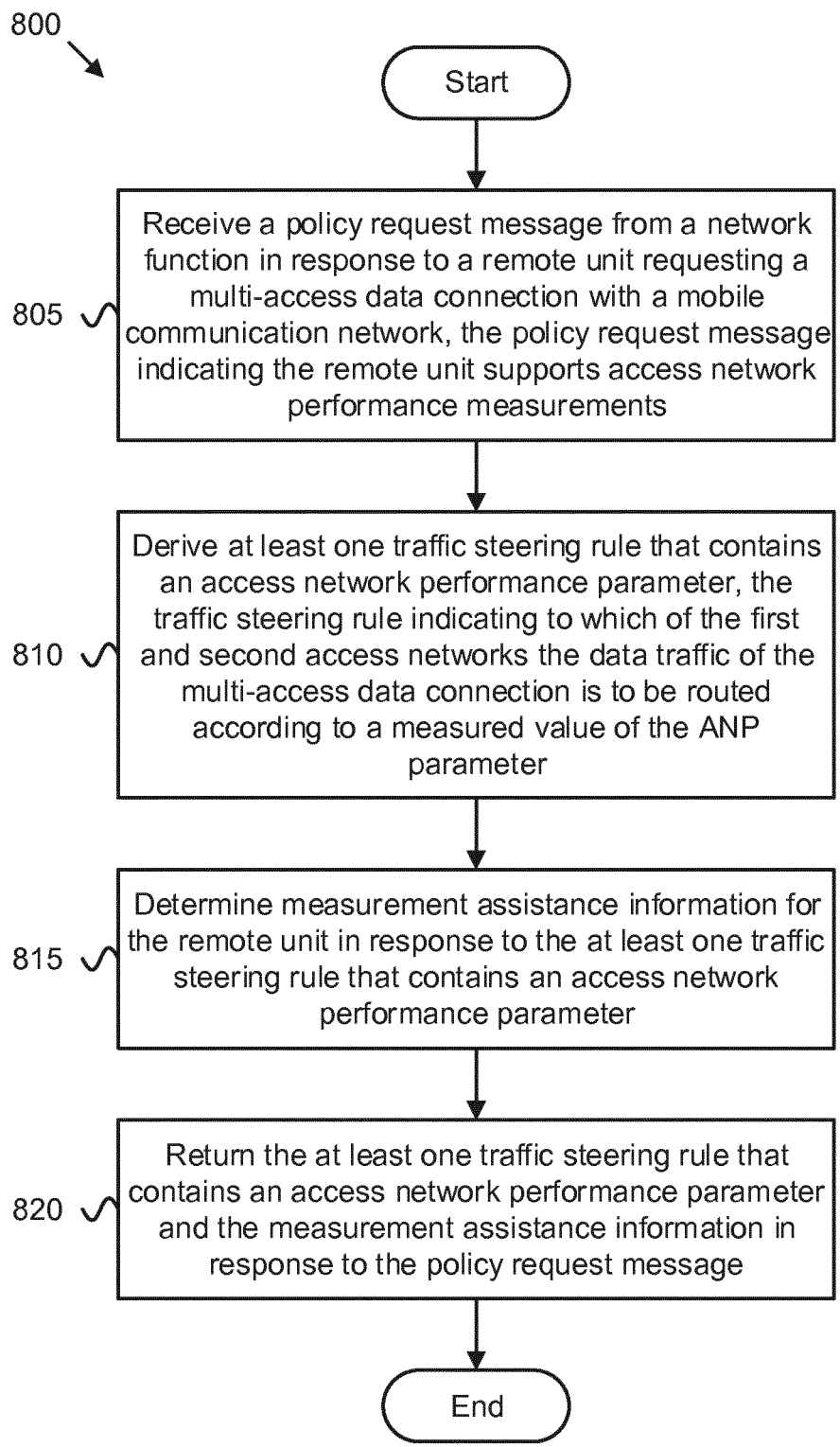
FIG. 8 is a flow chart diagram illustrating another embodiment of a method for measuring access network performance parameters for a multi-access data connection.

FIG. 8 depicts a method 800 for measuring access network performance parameters for a multi-access data connection, according to embodiments of the disclosure. In some embodiments, the method 800 is performed by an apparatus, such as the PCF 148, the PCF 235, and/or the network equipment apparatus 400. In certain embodiments, the method 800 may be performed by a processor executing program code, for example, a microcontroller, a microprocessor, a CPU, a GPU, an auxiliary processing unit, a FPGA, or the like.

The method 800 begins with receiving 805, from a network function, a policy request message in response to a remote unit requesting a multi-access data connection with a mobile communication network, the policy request message indicating the remote unit supports access network performance measurements. Here, the remote unit requests that a multi-access data connection be established over a first access network and a second access network. In various embodiments, the policy request message is received from a session management function, such as the SMF.

The method 800 includes deriving 810 at least one traffic steering rule that contains an ANP parameter, the traffic steering rule indicating to which of the first and second access networks data traffic of the multi-access data connection is to be routed according to a measure value of the ANP parameter. In various embodiments, the at least one ANP parameter comprises at least one of: a throughput on the first access network, an amount of delay on the first access network, a loss rate of the first access network, a throughput on the second access network, an amount of delay on the second access network, and a loss rate of the second access network.

The method 800 includes determining 815 measurement assistance information for the remote unit in response to the at least one traffic steering rule that contains an ANP parameter. In various embodiments of the second method, the measurement assistance information comprises one or more of: a network address of a PMF for measuring the at least one ANP parameter, a port of the PMF for measuring the at least one ANP parameter, an amount of data to transmit for measuring the at least one ANP parameter, a protocol for measuring the at least one ANP parameter, a measurement duration, and a measurement interval. In some embodiments, the apparatus selects a PMF for communicating data used to measure the at least one ANP parameter, reserves measurement resources for the remote unit at the PMF, and determines measurement assistance information for the remote unit based on the reserved measurement resources.

The method 800 includes returning 820 the at least one traffic steering rule that contains an ANP parameter and the measurement assistance information in response to the policy request message. In certain embodiments, returning 820 the at least one traffic steering rule that contains an ANP parameter comprises returning a Measurement Assistance policy, the Measurement Assistance policy including one or more access measurement rules, each access measurement rule indicating measurement assistance information for an access network. The method 800 ends.

Described herein is a first apparatus for measuring access network performance ("ANP") parameters for a multi-access data connection, the first apparatus including a processor, a first transceiver that communicates with a mobile communication network via a first access network, and a second transceiver that communicates with the mobile communication network via a second access network. The processor establishes a multi-access data connection, for example a MA-PDU, with a mobile communication network over the first access network and the second access network. The processor receives measurement assistance information. The processor measures at least one ANP parameter using the measurement assistance information. The processor also applies a traffic steering rule to uplink data traffic. Here, the traffic steering rule indicates to which of the first and second access networks the uplink data traffic is to be routed based on the measured at least one ANP parameter.

In certain embodiments of the first apparatus, establishing the multi-access data connection includes transmitting a PDU session establishment request containing an indication that the remote unit supports access network performance measurements, the multi-access data connection being a MA-PDU session. In such embodiments, receiving measurement assistance information may include the remote unit receiving a PDU session establishment accept message containing the measurement assistance information.

In some embodiments of the first apparatus, the processor transmits an indication that the remote unit supports access network performance measurements, said transmission included in a registration procedure with the mobile communication network.

In various embodiments of the first apparatus, the measurement assistance information includes one or more of: a network address of a PMF for communicating data used to measure the at least one ANP parameter, a port of the PMF for measuring the at least one ANP parameter, an amount of data to transmit for measuring the at least one ANP parameter, a protocol for measuring the at least one ANP parameter, a measurement duration, and a measurement interval.

In certain embodiments of the first apparatus, receiving the measurement assistance information includes receiving a Measurement Assistance policy. In such embodiments, the Measurement Assistance policy includes one or more rules, each rule indicating measurement assistance information for an access network.

In some embodiments of the first apparatus, the processor receives a set of traffic steering rules from the mobile communication network, the set of traffic steering rules including a particular ANP parameter. In such embodiments, measuring the at least one ANP parameter includes measuring only the particular ANP parameter.

In some embodiments, the first apparatus further includes a first transmission buffer associated with one of the first access network and a second transmission buffer associated with the second access network. In such embodiments, measuring the at least one ANP parameter comprises measuring the at least one ANP parameter over one of the first access network and the second access network in response to the corresponding transmission buffer being empty.

In some embodiments of the first apparatus, the processor detects data to be sent on the first access network of the multi-access data connection. In such embodiments, the processor may suspend measurement of the at least one ANP parameter on the first access network in response to detecting data to be sent on the first access network of the multi-access data connection. In other embodiments of the first apparatus, the processor may detect data to be sent on the second access network of the multi-access data connection. In such embodiments, the processor may suspend measurement of the at least one ANP parameter on the second access network in response to detecting data to be sent on the second access network of the multi-access data connection.

In various embodiments of the first apparatus, the at least one ANP parameter comprises at least one of: a throughput on the first access network, an amount of delay on the first access network, a loss rate of the first access network, a throughput on the second access network, an amount of delay on the second access network, and a loss rate of the second access network.

Described herein is a first method for measuring ANP parameters for a multi-access data connection, the first method includes establishing, at a remote unit, a multi-access data connection with a mobile communication network over a first access network and a second access network. The first method includes receiving measurement assistance information. The first method includes measuring, at the remote unit, at least one ANP parameter using the measurement assistance information. The first method also includes applying, at the remote unit, a traffic steering rule to uplink data traffic. Here, the traffic steering rule indicates to which of the first and second access networks the uplink data traffic is to be routed based on the measured at least one ANP parameter.

In certain embodiments of the first method, establishing the multi-access data connection includes the remote unit transmitting a PDU session establishment request containing an indication that the remote unit supports access network performance measurements, the multi-access data connection being a MA-PDU session. In such embodiments, receiving measurement assistance information may include the remote unit receiving a PDU session establishment accept message containing the measurement assistance information.

In some embodiments, the first method further includes transmitting an indication that the remote unit supports access network performance measurements, said transmission included in a registration procedure with the mobile communication network.

In certain embodiments of the first method, the measurement assistance information includes one or more of: a network address of a PMF for communicating data used to measure the at least one ANP parameter, a port of the PMF for measuring the at least one ANP parameter, an amount of data to transmit for measuring the at least one ANP parameter, a protocol for measuring the at least one ANP parameter, a measurement duration, and a measurement interval.

In certain embodiments of the first method, receiving the measurement assistance information includes receiving a Measurement Assistance policy, the Measurement Assistance policy including one or more rules, each rule indicating measurement assistance information for an access network.

In some embodiments, the first method further includes receiving a set of traffic steering rules from the mobile communication network, the set of traffic steering rules including a particular ANP parameter. In such embodiments, measuring the at least one ANP parameter may include measuring only the particular ANP parameter.

In certain embodiments of the first method, determining whether a transmission buffer associated with one of the first access network and the second access network is empty, wherein measuring the at least one ANP parameter over an access network occurs in response to the corresponding transmission buffer being empty. In certain embodiments of the first method, the transmission buffer corresponds to one of the first access network and the second access network. In such embodiments, measuring the at least one ANP parameter may include measuring the at least one ANP parameter for the corresponding one of the first access network and the second access network.

In some embodiments, the first method further includes detecting data to be sent on the first access network of the multi-access data connection and suspending measurement of the at least one ANP parameter on the first access network in response to detecting data to be sent on the first access network of the multi-access data connection. In other embodiments, the first method further includes detecting data to be sent on the second access network of the multi-access data connection and suspending measurement of the at least one ANP parameter on the second access network in response to detecting data to be sent on the second access network of the multi-access data connection.

In various embodiments of the first apparatus, the at least one ANP parameter comprises at least one of: a throughput on the first access network, an amount of delay on the first access network, a loss rate of the first access network, a throughput on the second access network, an amount of delay on the second access network, and a loss rate of the second access network.

Also disclosed herein is a second apparatus that includes a processor and a transceiver that communicates with one or more functions in a mobile communication network. The processor receives, from a network function, a policy request message in response to a remote unit requesting a multi-access data connection with a mobile communication network over a first access network and a second access network. Here, the policy request message indicates that the remote unit supports access network performance measurements. The processor derives at least one traffic steering rule that contains at least one ANP parameter. Here, the traffic steering rule indicates to which of the first and second access networks data traffic of the multi-access data connection is to be routed according to a measure value of an ANP parameter. The processor determines measurement assistance information for the remote unit in response to the at least one traffic steering rule that contains an ANP parameter. The processor also returns the at least one traffic steering rule that contains the at least one ANP parameter and the measurement assistance information in response to the policy request message.

In various embodiments of the second apparatus, the measurement assistance information comprises one or more of: a network address of a PMF for measuring the at least one ANP parameter, a port of the PMF for measuring the at least one ANP parameter, an amount of data to transmit for measuring the at least one ANP parameter, a protocol for measuring the at least one ANP parameter, a measurement duration, and a measurement interval.

In certain embodiments of the second apparatus, returning the at least one traffic steering rule that contains an ANP parameter comprises returning a Measurement Assistance policy, the Measurement Assistance policy including one or more access measurement rules, each access measurement rule indicating measurement assistance information for an access network.

In some embodiments of the second apparatus, the processor further selects a PMF for communicating data used to measure the at least one ANP parameter. In such embodiments, the processor reserves measurement resources for the remote unit at the PMF and determines measurement assistance information for the remote unit based on the reserved measurement resources.

In some embodiments of the second apparatus, the processor further receives at least one measured ANP parameter for one of the first access network and second access network from a PMF. In such embodiments, the processor forwards the at least one measured ANP parameter to the network function. Here, the mobile communication network uses the at least one measured ANP parameter to select one of the first access network and second access network for delivering downlink traffic to the remote unit.

In various embodiments of the second apparatus, the at least one ANP parameter comprises at least one of: a throughput on the first access network, an amount of delay on the first access network, a loss rate of the first access network, a throughput on the second access network, an amount of delay on the second access network, and a loss rate of the second access network.

Also disclosed herein is a second method that includes receiving, from a network function, a policy request message in response to a remote unit requesting a multi-access data connection with a mobile communication network over a first access network and a second access network, the policy request message indicating the remote unit supports access network performance measurements. The second method includes deriving at least one traffic steering rule that contains at least one ANP parameter, the traffic steering rule indicating to which of the first and second access networks data traffic of the multi-access data connection is to be routed according to a measure value of an ANP parameter. The second method includes determining measurement assistance information for the remote unit in response to the at least one traffic steering rule that contains an ANP parameter. The second method also includes returning the at least one traffic steering rule that contains the at least one ANP parameter and the measurement assistance information in response to the policy request message.

In various embodiments of the second method, the measurement assistance information comprises one or more of: a network address of a PMF for measuring the at least one ANP parameter, a port of the PMF for measuring the at least one ANP parameter, an amount of data to transmit for measuring the at least one ANP parameter, a protocol for measuring the at least one ANP parameter, a measurement duration, and a measurement interval.

In certain embodiments of the second method, returning the at least one traffic steering rule that contains an ANP parameter comprises returning a Measurement Assistance policy, the Measurement Assistance policy including one or more access measurement rules, each access measurement rule indicating measurement assistance information for an access network.

In some embodiments, the second method further includes selecting a PMF for communicating data used to measure the at least one ANP parameter, reserving measurement resources for the remote unit at the PMF, and determining measurement assistance information for the remote unit based on the reserved measurement resources.

In some embodiments, the second method further includes receiving at least one measured ANP parameter for one of the first access network and second access network from a PMF and forwarding the at least one measured ANP parameter to the network function, wherein the mobile communication network uses the at least one measured ANP parameter to select one of the first access network and second access network for delivering downlink traffic to the remote unit.

In various embodiments of the second method, the at least one ANP parameter comprises at least one of: a throughput on the first access network, an amount of delay on the first access network, a loss rate of the first access network, a throughput on the second access network, an amount of delay on the second access network, and a loss rate of the second access network.

Also disclosed herein is a third apparatus that includes a processor and a transceiver that communicates with one or more functions in a mobile communication network. The processor receives, from a network function, a session management request message in response to a remote unit requesting a multi-access data connection with a mobile communication network over a first access network and a second access network, the session management request message indicating the remote unit supports access network performance measurements. The processor receives at least one traffic steering rule that contains at least one ANP parameter, the traffic steering rule indicating to which of the first and second access networks data traffic of the multi-access data connection is to be routed according to a measure value of an ANP parameter. The processor determines measurement assistance information for the remote unit in response to the at least one traffic steering rule that contains the at least one ANP parameter. The transceiver also sends, to the remote unit, an accept message containing steering rules for the remote unit (i.e. ATSSS rules) and the determined measurement assistance information, in response to the session management request message.

In various embodiments of the third apparatus, the measurement assistance information comprises one or more of: a network address of a PMF for measuring the at least one ANP parameter, a port of the PMF for measuring the at least one ANP parameter, an amount of data to transmit for measuring the at least one ANP parameter, a protocol for measuring the at least one ANP parameter, a measurement duration, and a measurement interval.

In certain embodiments of the third apparatus, sending to the remote unit an accept message containing steering rules for the remote unit (i.e. ATSSS rules) and the determined measurement assistance information includes sending a Measurement Assistance policy. Here, the Measurement Assistance policy includes one or more access measurement rules, each access measurement rule indicating measurement assistance information for an access network.

In some embodiments of the third apparatus, the processor further: selects a PMF for communicating data used to measure the at least one ANP parameter, reserves measurement resources for the remote unit at the PMF, and determines measurement assistance information for the remote unit based on the reserved measurement resources.

In some embodiments of the third apparatus, the processor further receives at least one measured ANP parameter for one of the first access network and second access network from a PMF and forwards the at least one measured ANP parameter to a user plane function. In such embodiments, the mobile communication network uses the at least one measured ANP parameter to select one of the first access network and second access network for delivering downlink traffic to the remote unit.

In various embodiments of the third apparatus, the at least one ANP parameter comprises at least one of: a throughput on the first access network, an amount of delay on the first access network, a loss rate of the first access network, a throughput on the second access network, an amount of delay on the second access network, and a loss rate of the second access network.

Also disclosed herein is a third method that includes receiving, from a network function, a session management request message in response to a remote unit requesting a multi-access data connection with a mobile communication network over a first access network and a second access network, the session management request message indicating the remote unit supports access network performance measurements. The third method includes receiving at least one traffic steering rule that contains at least one ANP parameter, the traffic steering rule indicating to which of the first and second access networks data traffic of the multi-access data connection is to be routed according to a measure value of an ANP parameter. The third method includes determining measurement assistance information for the remote unit in response to the at least one traffic steering rule that contains the at least one ANP parameter. The third method also includes sending to the remote unit an accept message containing steering rules for the remote unit (i.e. ATSSS rules) and the determined measurement assistance information, in response to the session management request message.

In various embodiments of the third method, the measurement assistance information comprises one or more of: a network address of a PMF for measuring the at least one ANP parameter, a port of the PMF for measuring the at least one ANP parameter, an amount of data to transmit for measuring the at least one ANP parameter, a protocol for measuring the at least one ANP parameter, a measurement duration, and a measurement interval.

In certain embodiments of the third method, sending to the remote unit an accept message containing steering rules for the remote unit (i.e. ATSSS rules) and the determined measurement assistance information comprises sending a Measurement Assistance policy, the Measurement Assistance policy including one or more access measurement rules, each access measurement rule indicating measurement assistance information for an access network.

In some embodiments, the third method further includes selecting a PMF for communicating data used to measure the at least one ANP parameter, reserving measurement resources for the remote unit at the PMF, and determining measurement assistance information for the remote unit based on the reserved measurement resources.

In some embodiments, the third method further includes receiving at least one measured ANP parameter for one of the first access network and second access network from a PMF and forwarding the at least one measured ANP parameter to a user plane function, wherein the mobile communication network uses the at least one measured ANP parameter to select one of the first access network and second access network for delivering downlink traffic to the remote unit.

In various embodiments of the third method, the at least one ANP parameter comprises at least one of: a throughput on the first access network, an amount of delay on the first access network, a loss rate of the first access network, a throughput on the second access network, an amount of delay on the second access network, and a loss rate of the second access network.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
a first transceiver that communicates with a mobile communication network via a first access network;
a second transceiver that communicates with the mobile communication network via a second access network; and
a processor that
establishes a multi-access data connection with the mobile communication network over the first access network and the second access network, wherein establishing the multi-access data connection comprises transmitting a Packet Data Unit ("PDU") session establishment request;
receives measurement assistance information, wherein receiving measurement assistance information comprises receiving a PDU session establishment accept message containing the measurement assistance information;
measures at least one access network performance ("ANP") parameter using the measurement assistance information; and
applies a traffic steering rule to uplink data traffic, the traffic steering rule indicating to which of the first and second access networks the uplink data traffic is to be routed based on the measured at least one ANP parameter.

2. The apparatus of claim 1, wherein the PDU session establishment request contains an indication that the apparatus supports access network performance measurements, wherein the multi-access data connection is a Multi-Access PDU ("MA-PDU") session.

3. The apparatus of claim 1, wherein the processor transmits an indication that the apparatus supports access network performance measurements, said transmission included in a registration procedure with the mobile communication network.

4. The apparatus of claim 1, wherein the measurement assistance information comprises one or more of: a network address of a performance measurement function ("PMF") for communicating data used to measure the at least one ANP parameter, a port of the PMF for measuring the at least one ANP parameter, an amount of data to transmit for measuring the at least one ANP parameter, a protocol for measuring the at least one ANP parameter, a measurement duration, and a measurement interval.

5. The apparatus of claim 1, wherein receiving the measurement assistance information comprises receiving a Measurement Assistance policy, the Measurement Assistance policy including one or more rules, each rule indicating measurement assistance information for an access network.

6. The apparatus of claim 1, wherein the processor receives a set of traffic steering rules from the mobile communication network, the set of traffic steering rules including a particular ANP parameter, wherein measuring the at least one ANP parameter comprises measuring only the particular ANP parameter.

7. The apparatus of claim 1, further comprising a first transmission buffer associated with one of the first access network and a second transmission buffer associated with the second access network, wherein measuring the at least one ANP parameter comprises measuring the at least one ANP parameter over one of the first access network and the second access network in response to the corresponding transmission buffer being empty.

8. The apparatus of claim 1, wherein the at least one ANP parameter comprises at least one of: a throughput on the first access network, an amount of delay on the first access network, a loss rate of the first access network, a throughput on the second access network, an amount of delay on the second access network, and a loss rate of the second access network.

9. A method comprising:
establishing, at a remote unit, a multi-access data connection with a mobile communication network over a first access network and a second access network, wherein establishing the multi-access data connection comprises transmitting a Packet Data Unit ("PDU") session establishment request;
receiving measurement assistance information, wherein receiving measurement assistance information comprises receiving a PDU session establishment accept message containing the measurement assistance information;
measuring, at the remote unit, at least one access network performance ("ANP") parameter using the measurement assistance information; and
applying, at the remote unit, a traffic steering rule to uplink data traffic, the traffic steering rule indicating to which of the first and second access networks the uplink data traffic is to be routed based on the measured at least one ANP parameter.

10. The method of claim 9, wherein the PDU session establishment request contains an indication that the remote unit supports access network performance measurements, the multi-access data connection being a Multi-Access PDU ("MA-PDU") session.

11. The method of claim 9, wherein the measurement assistance information comprises one or more of: a network address of a performance measurement function ("PMF") for communicating data used to measure the at least one ANP parameter, a port of the PMF for measuring the at least one ANP parameter, an amount of data to transmit for measuring the at least one ANP parameter, a protocol for measuring the at least one ANP parameter, a measurement duration, and a measurement interval.

12. An apparatus comprising:
a transceiver that communicates with one or more functions in a mobile communication network; and
a processor that:
receives, from a network function, a policy request message in response to a remote unit requesting a multi-access data connection with the mobile communication network over a first access network and a second access network, the policy request message indicating the remote unit supports access network performance measurements;
derives at least one traffic steering rule that contains an access network performance ("ANP") parameter, the traffic steering rule indicating to which of the first and second access networks data traffic of the multi-access data connection is to be routed according to a measured value of the ANP parameter;
determines measurement assistance information for the remote unit in response to the at least one traffic steering rule that contains the ANP parameter; and
returns the at least one traffic steering rule that contains the ANP parameter and the measurement assistance information in response to the policy request message.

13. The apparatus of claim 12, wherein the measurement assistance information comprises one or more of: a network address of a performance measurement function ("PMF") for measuring the ANP parameter, a port of the PMF for measuring the ANP parameter, an amount of data to transmit for measuring the ANP parameter, a protocol for measuring the ANP parameter, a measurement duration, and a measurement interval.

14. The apparatus of claim 12, wherein returning the at least one traffic steering rule that contains the ANP parameter comprises returning a measurement assistance policy, the measurement assistance policy including one or more measurement assistance rules, each measurement assistance rule indicating measurement assistance information for an access network.

15. The apparatus of claim 12, wherein the processor further:
selects a performance measurement function ("PMF") for communicating data used to measure the ANP parameter;
reserves measurement resources for the remote unit at the PMF; and
determines measurement assistance information for the remote unit based on the reserved measurement resources.

16. The apparatus of claim 12, wherein the processor further:
  receives at least one measured ANP parameter for one of the first access network and second access network from a performance measurement function ("PMF"); and
  forwards the at least one measured ANP parameter to the network function, wherein the mobile communication network uses the at least one measured ANP parameter to select one of the first access network and second access network for delivering downlink traffic to the remote unit.

17. The apparatus of claim 12, wherein the ANP parameter comprises one of: a throughput on the first access network, an amount of delay on the first access network, a loss rate of the first access network, a throughput on the second access network, an amount of delay on the second access network, and a loss rate of the second access network.

18. A method comprising:
  receiving, from a network function, a policy request message in response to a remote unit requesting a multi-access data connection with a mobile communication network over a first access network and a second access network, the policy request message indicating the remote unit supports access network performance measurements;
  deriving at least one traffic steering rule that contains an access network performance ("ANP") parameter, the traffic steering rule indicating to which of the first and second access networks data traffic of the multi-access data connection is to be routed according to a measured value of the ANP parameter;
  determining measurement assistance information for the remote unit in response to the at least one traffic steering rule that contains the ANP parameter; and
  returning the at least one traffic steering rule that contains the ANP parameter and the measurement assistance information in response to the policy request message.

19. The method of claim 18, wherein the measurement assistance information comprises one or more of: a network address of a performance measurement function ("PMF") for measuring the ANP parameter, a port of the PMF for measuring the ANP parameter, an amount of data to transmit for measuring the ANP parameter, a protocol for measuring the ANP parameter, a measurement duration, and a measurement interval.

20. The method of claim 18, wherein returning the at least one traffic steering rule that contains the ANP parameter comprises returning a measurement assistance policy, the measurement assistance policy including one or more measurement assistance rules, each measurement assistance rule indicating measurement assistance information for an access network.

* * * * *